(12) United States Patent
Contopanagos et al.

(10) Patent No.: US 9,899,744 B1
(45) Date of Patent: Feb. 20, 2018

(54) ANTENNA FOR WIRELESS CHARGING SYSTEMS

(71) Applicant: ENERGOUS CORPORATION, San Jose, CA (US)

(72) Inventors: Harry Contopanagos, Kifissia (GR); Michael A. Leabman, San Ramon, CA (US)

(73) Assignee: Energous Corporation, San Jose, CA (US)

( * ) Notice: Subject to any disclaimer, the term of this patent is extended or adjusted under 35 U.S.C. 154(b) by 52 days.

(21) Appl. No.: 14/925,469

(22) Filed: Oct. 28, 2015

(51) Int. Cl.
| H01Q 1/12 | (2006.01) |
| H01Q 19/06 | (2006.01) |
| H01Q 1/27 | (2006.01) |
| H01Q 21/00 | (2006.01) |

(52) U.S. Cl.
CPC ........... *H01Q 19/062* (2013.01); *H01Q 1/273* (2013.01); *H01Q 21/0087* (2013.01)

(58) Field of Classification Search
CPC ....... H01Q 1/12; H01Q 1/273; H01Q 21/0087
USPC ........................................................ 343/718
See application file for complete search history.

(56) References Cited

U.S. PATENT DOCUMENTS

| 787,412 A | 4/1905 | Tesla |
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,548,292 A | 8/1996 | Hirshfield et al. |
| 5,556,749 A | 9/1996 | Mitsuhashi et al. |

(Continued)

FOREIGN PATENT DOCUMENTS

| CN | 203826555 U | 9/2014 |
| CN | 104090265 A | 10/2014 |

(Continued)

OTHER PUBLICATIONS

International Search Report dated Sep. 12, 2014 corresponding to International Patent Application No. PCT/US2014/037072, 3 pages.

(Continued)

*Primary Examiner* — Huedung Mancuso
(74) *Attorney, Agent, or Firm* — Morgan, Lewis & Bockius LLP

(57) ABSTRACT

A metamaterial system of a wireless transmission apparatus comprises a metamaterial layer. The metamaterial layer comprises an array of unit cells wherein each of the unit cell comprises a surface having a metal patch with an aperture. The aperture is defined such that a periphery of the aperture is within a periphery of the surface by a spacing distance and an element is disposed within the aperture. The metamaterial system further comprises at least one input RF port placed on a backing layer disposed below the metamaterial layer such that there is no short-circuit between the conductive backing layer and the metamaterial layer; and at least one set of vias connecting the array of unit cells with the at least one input RF port.

20 Claims, 36 Drawing Sheets
(16 of 36 Drawing Sheet(s) Filed in Color)

(56) References Cited

U.S. PATENT DOCUMENTS

| | | | |
|---|---|---|---|
| 5,568,088 A | 10/1996 | Dent et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,127,799 A | 10/2000 | Krishnan |
| 6,127,942 A | 10/2000 | Welle |
| 6,163,296 A | 12/2000 | Lier et al. |
| 6,289,237 B1 | 9/2001 | Mickle et al. |
| 6,329,908 B1 | 12/2001 | Frecska |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Arndt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,664,920 B1 | 12/2003 | Mott et al. |
| 6,798,716 B1 | 9/2004 | Charych |
| 6,803,744 B1 | 10/2004 | Sabo |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,234 B2 * | 6/2006 | Sievenpiper ............ H01Q 3/26 343/745 |
| 7,068,991 B2 | 6/2006 | Parise |
| 7,183,748 B1 | 2/2007 | Unno et al. |
| 7,191,013 B1 | 3/2007 | Miranda et al. |
| 7,196,663 B2 | 3/2007 | Bolzer et al. |
| 7,205,749 B2 | 4/2007 | Hagen et al. |
| 7,222,356 B1 | 5/2007 | Yonezawa et al. |
| 7,274,334 B2 | 9/2007 | o'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,392,068 B2 | 6/2008 | Dayan |
| 7,403,803 B2 | 7/2008 | Mickle et al. |
| 7,451,839 B2 | 11/2008 | Perlman |
| 7,463,201 B2 | 12/2008 | Chiang et al. |
| 7,471,247 B2 * | 12/2008 | Saily ...................... H01Q 1/523 343/700 MS |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 * | 3/2011 | Itoh ...................... H01Q 9/0407 343/700 MS |
| 7,925,308 B2 | 4/2011 | Greene et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,228,194 B2 | 7/2012 | Mickle |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,362,745 B2 | 1/2013 | Tinaphong |
| 8,380,255 B2 | 2/2013 | Shearer et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 * | 5/2013 | Fluhler ............ H01Q 15/0086 343/756 |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,854,176 B2 | 10/2014 | Zeine |
| 8,860,364 B2 | 10/2014 | Low et al. |
| 8,897,770 B1 | 11/2014 | Frolov et al. |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,178,389 B2 | 11/2015 | Hwang |
| 9,225,196 B2 | 12/2015 | Huang et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,444,283 B2 | 9/2016 | Son et al. |
| 9,450,449 B1 | 9/2016 | Leabman et al. |
| 9,461,502 B2 | 10/2016 | Lee et al. |

(56) References Cited

U.S. PATENT DOCUMENTS

| | | |
|---|---|---|
| 9,520,725 B2 | 12/2016 | Masaoka et al. |
| 9,520,748 B2 | 12/2016 | Hyde et al. |
| 9,522,270 B2 | 12/2016 | Perryman |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bac |
| 9,564,773 B2 | 2/2017 | Pogorelik et al. |
| 9,571,974 B2 | 2/2017 | Choi et al. |
| 9,590,444 B2 | 3/2017 | Walley |
| 9,620,996 B2 | 4/2017 | Zeine |
| 2002/0001307 A1 | 1/2002 | Nguyen et al. |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0133592 A1 | 9/2002 | Matsuda |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0113543 A1 | 6/2004 | Daniels |
| 2004/0119675 A1 | 6/2004 | Washio et al. |
| 2004/0107641 A1 | 7/2004 | Walton et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0093766 A1 | 5/2005 | Turner |
| 2005/0116683 A1 | 6/2005 | Cheng |
| 2005/0117660 A1 | 6/2005 | Vialle et al. |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partoyi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran |
| 2007/0222681 A1 | 9/2007 | Greene et al. |
| 2007/0257634 A1 | 11/2007 | Leschin et al. |
| 2007/0273486 A1 | 11/2007 | Shiotsu |
| 2007/0298846 A1 | 12/2007 | Greene et al. |
| 2008/0014897 A1 | 1/2008 | Cook et al. |
| 2008/0048917 A1* | 2/2008 | Achour .................. H01Q 1/38 343/700 MS |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0248758 A1 | 10/2008 | Schedelbeck et al. |
| 2008/0248846 A1 | 10/2008 | Stronach et al. |
| 2008/0278378 A1 | 11/2008 | Chang et al. |
| 2008/0309452 A1 | 12/2008 | Zeine |
| 2009/0002493 A1 | 1/2009 | Kates |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0067208 A1 | 3/2009 | Martin et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0291634 A1 | 11/2009 | Saarisalo |
| 2009/0299175 A1 | 12/2009 | Bernstein et al. |

(56) References Cited

U.S. PATENT DOCUMENTS

| | | |
|---|---|---|
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarrnan et al. |
| 2010/0007569 A1 | 1/2010 | Sim et al. |
| 2010/0019686 A1 | 1/2010 | Gutierrez, Jr. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0119234 A1 | 5/2010 | Suematsu et al. |
| 2010/0123618 A1 | 5/2010 | Martin et al. |
| 2010/0123624 A1 | 5/2010 | Mincar et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0151808 A1 | 6/2010 | Toncich et al. |
| 2010/0156721 A1 | 6/2010 | Alamouti et al. |
| 2010/0164433 A1 | 7/2010 | Janefalker et al. |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0214177 A1 | 8/2010 | Parsche |
| 2010/0225270 A1 | 9/2010 | Jacobs et al. |
| 2010/0227570 A1 | 9/2010 | Hendin |
| 2010/0231470 A1* | 9/2010 | Lee .................. H01Q 13/10 343/722 |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Warman |
| 2011/0304437 A1 | 12/2011 | Beeler |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mcsibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0074891 A1 | 3/2012 | Anderson et al. |
| 2012/0231856 A1 | 3/2012 | Lee et al. |
| 2012/0080957 A1 | 4/2012 | Cooper et al. |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |

(56) References Cited

U.S. PATENT DOCUMENTS

| | | |
|---|---|---|
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0181973 A1 | 7/2012 | Lyden |
| 2012/0182427 A1 | 7/2012 | Marshall |
| 2012/0187851 A1 | 7/2012 | Huggins et al. |
| 2012/0193999 A1 | 8/2012 | Zeine |
| 2012/0201153 A1 | 8/2012 | Bharadia et al. |
| 2012/0201173 A1 | 8/2012 | Jain et al. |
| 2012/0206299 A1 | 8/2012 | Valdes-Garcia |
| 2012/0212072 A1 | 8/2012 | Miyabayashi et al. |
| 2012/0214536 A1 | 8/2012 | Kim et al. |
| 2012/0200399 A1 | 9/2012 | Chae |
| 2012/0228956 A1 | 9/2012 | Kamata |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0326660 A1 | 12/2012 | Lu et al. |
| 2013/0002550 A1 | 1/2013 | Zalewski |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0049471 A1 | 2/2013 | Oleynik |
| 2013/0049475 A1 | 2/2013 | Kim et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0178253 A1 | 7/2013 | Karaoguz |
| 2013/0181881 A1 | 7/2013 | Christie et al. |
| 2013/0190031 A1 | 7/2013 | Persson |
| 2013/0193769 A1 | 8/2013 | Mchta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0210357 A1 | 8/2013 | Qin et al. |
| 2013/0221757 A1 | 8/2013 | Cho et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278209 A1 | 10/2013 | Von Novak |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0293423 A1 | 11/2013 | Moshfeghi |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0035524 A1 | 2/2014 | Zeine |

(56) References Cited

U.S. PATENT DOCUMENTS

| | | |
|---|---|---|
| 2014/0035526 A1 | 2/2014 | Tripathi et al. |
| 2014/0049422 A1 | 2/2014 | Von Novak et al. |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0175893 A1 | 6/2014 | Sengupta et al. |
| 2014/0176054 A1 | 6/2014 | Porat et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0206384 A1 | 7/2014 | Kim et al. |
| 2014/0210281 A1 | 7/2014 | Ito et al. |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0029397 A1 | 1/2015 | Leabman et al. |
| 2015/0035715 A1 | 2/2015 | Kim et al. |
| 2015/0041459 A1 | 2/2015 | Leabman et al. |
| 2015/0042264 A1 | 2/2015 | Leabman et al. |
| 2015/0042265 A1 | 2/2015 | Lcabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0108848 A1 | 4/2015 | Joehren |
| 2015/0115877 A1 | 4/2015 | Aria et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1* | 6/2015 | Hunt .................. H01Q 15/0086 343/754 |
| 2015/0188352 A1 | 7/2015 | Peek et al. |
| 2015/0199665 A1 | 7/2015 | Chu |
| 2015/0207333 A1 | 7/2015 | Bauman et al. |
| 2015/0207542 A1 | 7/2015 | Zeine |
| 2015/0222126 A1 | 8/2015 | Leabman et al. |
| 2015/0236520 A1 | 8/2015 | Baarman |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0263534 A1 | 9/2015 | Lee et al. |
| 2015/0263548 A1 | 9/2015 | Cooper |
| 2015/0270741 A1 | 9/2015 | Leabman et al. |
| 2015/0280484 A1 | 10/2015 | Radziemski et al. |
| 2015/0288438 A1 | 10/2015 | Maltscv et al. |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0333528 A1 | 11/2015 | Leabman |

(56) References Cited

U.S. PATENT DOCUMENTS

| | | |
|---|---|---|
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0204622 A1 | 7/2016 | Leabman |
| 2016/0204642 A1 | 7/2016 | Oh |
| 2016/0238365 A1 | 8/2016 | Wixey et al. |
| 2016/0299210 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2017/0005516 A9 | 1/2017 | Leabman et al. |
| 2017/0005530 A1 | 1/2017 | Zeine et al. |
| 2017/0025903 A1 | 1/2017 | Song et al. |
| 2017/0026087 A1 | 1/2017 | Tanabe |
| 2017/0043675 A1 | 2/2017 | Jones et al. |
| 2017/0047784 A1 | 2/2017 | Jung et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077995 A1 | 3/2017 | Leabman |
| 2017/0085120 A1 | 3/2017 | Leabman et al. |
| 2017/0085437 A1 | 3/2017 | Condeixa et al. |
| 2017/0092115 A1 | 3/2017 | Sloo et al. |
| 2017/0110887 A1 | 4/2017 | Bell et al. |
| 2017/0134686 A9 | 5/2017 | Leabman |
| 2017/0163076 A1 | 6/2017 | Park et al. |
| 2017/0179763 A9 | 6/2017 | Leabman |

FOREIGN PATENT DOCUMENTS

| | | |
|---|---|---|
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 | 9/2011 |
| JP | 2006157586 A | 6/2006 |
| JP | 2007043432 A | 2/2007 |
| JP | 2008167017 A | 7/2008 |
| KR | 20060011776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 1020130026977 A | 3/2013 |
| WO | 9952173 A2 | 10/1999 |
| WO | WO 200111716 A1 | 2/2001 |
| WO | 2004077550 A1 | 9/2004 |
| WO | 2003091943 A1 | 11/2006 |
| WO | WO 2006122783 | 11/2006 |
| WO | 2008156571 A2 | 12/2008 |
| WO | 2010022181 A1 | 2/2010 |
| WO | WO 2010039246 A1 | 4/2010 |
| WO | WO 2010138994 A1 | 12/2010 |
| WO | 2011112022 A2 | 9/2011 |
| WO | WO 2012177283 A1 | 12/2012 |
| WO | 2013035190 A1 | 3/2013 |
| WO | WO 2013031988 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016048512 A1 | 3/2016 |
| WO | WO 2016187357 A1 | 11/2016 |

OTHER PUBLICATIONS

International Search Report dated Jan. 27, 2015 corresponding to International Patent Application No. PCT/US2014/037170, 4 pages.
International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.
Energous Corp., Written Opinion, PCT/US2014/037170, dated Sep. 15, 2014, 7 pgs.
Energous Corp., IPRP, PCT/US2014/037170, dated Nov. 10, 2015, 8 pgs.
Energous Corp., Written Opinion, PCT/US2014/041534, dated Oct. 13, 2014, 6 pgs.
Energous Corp., IPRP, PCT/US2614/041534, dated Dec. 29, 2015, 7 pgs.
Encrgous Corp., IPRP, PCT/US2014/046956, dated Jan. 19, 2016, 7 pgs.

(56) References Cited

OTHER PUBLICATIONS

Energous Corp., Written Opinion, PCT/US2014/037072, dated Sep. 12, 2014, 5 pgs.
Energous Corp., IPRP, PCT/US2014/037072, dated Nov. 10, 2015, 6 pgs.
Energous Corp., ISRWO, PCT/US2014/068568, dated Mar. 20, 2015, 10 pgs.
Energous Corp., IPRP, PCT/US2014/068568, dated Jun. 14, 2016, 8 pgs.
Energous Corp., ISRWO, PCT/US2014/055195, dated Dec. 22, 2014, 11 pgs.
Energous Corp., IPRP, PCT/US2014/055195, dated Mar. 22, 2016, 9 pgs.
Encrgous Corp., ISRWO, PCT/US2015/067291, dated Mar. 4, 2016, 10 pgs.
Energous Corp., IPRP, PCT/US2015/067291, dated Jul. 4, 2017, 4 pgs.
Energous Corp., ISRWO, PCT/US2015/067242, dated Mar. 16, 2016, 9 pgs.
Energous Corp., IPRP, PCT/US2015/067242, dated Jun. 27, 2017, 7 pgs.
Energous Corp., ISRWO, PCT/US2015/067243, dated Mar. 10, 2016, 11 pgs.
Energous Corp., IPRP, PCT/US2015/067243, dated Jun. 27, 2017, 7 pgs.
Energous Corp., ISRWO, PCT/US2014/037109, dated Apr. 8, 2016, 12 pgs.
Energous Corp., IPRP, PCT/US2014/037109, dated Apr. 12, 2016, 9 pgs.
Energous Corp., ISRWO, PCT/US2015/067275, dated Mar. 3, 2016, 8 pgs.
Energous Corp., IPRP, PCT/US2015/067275, dated Jul. 4, 2017, 7 pgs.
Energous Corp., ISRWO, PCT/US2015/067245, dated Mar. 17, 2016. 8 pgs.
Energous Corp., IPRP, PCT/US2015/067245, dated Jun. 27, 2017, 7 pgs.
Energous Corp., ISRWO, PCT/US2014/041546, dated Oct. 16, 2014, 12 pgs.
Energous Corp., IPRP, PCT/US2014/041546, dated Dec. 29, 2015, 9 pgs.
Encrgous Corp., ISRWO, PCT/US2015/67250, dated Mar. 30, 2016, 11 pgs.
Energous Corp., IPRP, PCT/US2015/67250, dated Mar. 30, 2016, 10 pgs.
Energous Corp., ISRWO, PCT/US2015/067325, dated Mar. 10, 2016, 9 pgs.
Energous Corp., IPRP, PCT/US2015/067325, dated Jul. 4 2017, 8 pgs.
Energous Corp., ISRWO, PCT/US2014/040697, dated Oct. 1, 2014, 12 pgs.
Energous Corp., IPRP, PCT/US2014/040697, dated Dec. 8, 2015, 9 pgs.
Energous Corp., ISRWO, PCT/US2014/040705, dated Sep. 23, 2014, 8 pgs.
Encrgous Corp., IPRP, PCT/US2014/040705, dated Dec. 8, 2015, 6 pgs.
Energous Corp., ISRWO, PCT/US2015/067249, dated Mar. 29, 2016, 8 pgs.
Energous Corp., IPRP, PCT/US2015/067249, dated Jun. 27, 2017, 7 pgs.
Energous Corp., ISRWO, PCT/US2015/067246, dated May 11, 2016, 18 pgs.
Energous Corp., IPRP, PCT/US2015/067246, dated Jun. 27, 2017, 9 pgs.
Energous Corp , ISRWO, PCT/US2014/059317, dated Feb. 24, 2015, 13 pgs.
Energous Corp., IPRP, PCT/US2014/059317, dated Apr. 12, 2016, 10 pgs.
Energous Corp., ISRWO, PCT/US2014/049669, dated Nov. 13, 2014, 10 pgs.
Energous Corp., IPRP, PCT/US2014/049669, dated Feb. 9, 2016, 8 pgs.
Energous Corp., ISRWO. PCT/US2014/041323, dated Oct. 1, 2014, 10 pgs.
Energous Corp., IPRP, PCT/US2014/041323, dated Dec. 22, 2015, 8 pgs.
Energous Corp., ISRWO, PCT/US2014/048002, dated Nov. 13, 2014, 11 pgs.
Energous Corp., IPRP, PCT/US2014/048002, dated Feb. 12, 2015 8 pgs.
Energous Corp., ISRWO, PCT/US2014/062682, dated Feb. 12, 2015, 10 pgs.
Energous Corp., IPRP, PCT/US2014/062682, dated May 3, 2016, 8 pgs.
Energous Corp., ISRWO, PCT/US2014/049666, dated Nov. 10, 2014, 7 pgs.
Energous Corp., IPRP, PCT/US2014/049666, dated Feb. 9, 2016, 5 pgs.
Energous Corp., ISRWO, PCT/US2014/046961, dated Nov. 24, 2014, 16 pgs.
Energous Corp., IPRP, PCT/US2014/046961, dated Jan. 19, 2016, 8 pgs.
Energous Corp., ISRWO, PCT/US2015/067279, dated Mar. 11, 2015. 13 pgs.
Energous Corp., IPRP, PCT/US2015/067279, dated Jul. 4, 2017, 7 pgs.
Energous Corp., ISRWO, PCT/US2014/041342, dated Jan. 27, 2015, 10 pgs.
Energous Corp., IPRP, PCT/US2014/041342, dated Dec. 15, 2015, 8 pgs.
Energous Corp., ISRWO, PCT/US2014/046941, dated Nov. 6, 2014, 11 pgs.
Energous Corp., IPRP, PCT/US2014/046941, dated Jan. 19, 2016, 9 pgs.
Energous Corp., ISRWO, PCT/US2014/062661, dated Jan. 27, 2015, 12 pgs.
Energous Corp., IPRP, PCT/US2014/062661, dated May 3, 2016, 10 pgs.
Energous Corp., ISRWO, PCT/US2014/059871, dated Jan. 23, 2015, 12 pgs.
Energous Corp., IPRP, PCT/US2014/059871, dated Apr. 12, 2016, 9 pgs.
Encrgous Corp., ISRWO, PCT/US2014/045102, dated Oct. 28, 2014, 14 pgs.
Energous Corp., IPRP, PCT/US2014/045102, dated Jan. 12, 2016, 11 pgs.
Energous Corp., ISRWO, PCT/US2014/059340, dated Jan. 15, 2015, 13 pgs.
Energous Corp., IPRP, PCT/US2014/059340, dated Apr. 12, 2016, 11 pgs.
Energous Corp., ISRWO, PCT/US2015/067282, dated Jul. 5, 2016, 7 pgs.
Energous Corp., IPRP, PCT/US2015/067282, dated Jul. 4, 2017, 6 pgs.
Encrgous Corp., ISRWO, PCT/US2014/041558, dated Oct. 10, 2014, 8 pgs.
Energous Corp., IPRP, PCT/US2014/041558, dated Dec. 29, 2015, 6 pgs.
Energous Corp., ISRWO, PCT/US2014/045119, dated Oct. 13, 2014, 11 pgs.
Energous Corp., IPRP, PCT/US2014/045119, dated Jan. 12, 2016, 9 pgs.
Energous Corp., ISRWO, PCT/US2014/045237, dated Oct. 13, 2014, 16 pgs.
Energous Corp., IPRP, PCT/US2014/045237, dated Jan. 12, 2016, 12 pgs.
Energous Corp., ISRWO, PCT/US2014/054897, dated Feb. 17, 2015, 10 pgs.
Energous Corp., IPRP, PCT/US2014/054897, dated Mar. 15, 2016, 8 pgs.

(56) References Cited

OTHER PUBLICATIONS

Energous Corp., ISRWO, PCT/US2015/067334, dated Mar. 3, 2016, 6 pgs.
Energous Corp., IPRP, PCT/US2015/067334, dated Jul. 4, 2017, 5 pgs.
Energous Corp., ISRWO, PCT/US2014/047963, dated Nov. 7, 2014, 13 pgs.
Energous Corp., IPRP, PCT/US2014/047963, dated Jan. 26, 2016, 10 pgs.
Energous Corp., ISRWO, PCT/US2014/054891, dated Dec. 18, 2014, 12 pgs.
Energous Corp., IPRP, PCT/US2014/054891, dated Mar. 15, 2016, 10 pgs.
Energous Corp., ISRWO, PCT/US2014/054953, dated Dec. 4, 2014, 7 pgs.
Energous Corp., IPRP, PCT/US2014/054953, dated Mar. 22, 2016, 5 pgs.
Energous Corp., ISRWO, PCT/US2015/067294, dated Mar. 29, 2016, 7 pgs.
Encegous Corp., IPRP, PCT/US2015/067294, dated Jul. 4, 2017, 6 pgs.
Energous Corp., ISRWO, PCT/US2014/062672 dated Jan. 26, 2015, 11 pgs.
Energous Corp., IPRP, PCT/US2014/062672 dated May 10, 2016, 8 pgs.
Energous Corp., ISRWO, PCT/US2014/044810 dated Oct. 21, 2014, 12 pgs.
Energous Corp., IPRP, PCT/US2014/044810, dated Jan. 5, 2016, 10 pgs.
Encrgous Corp., ISRWO, PCT/US2015/067271, dated Mar. 11, 2016, 6 pgs.
Energous Corp., IPRP, PCT/US2015/067271, dated Jul. 4, 2017, 5 pgs.
Energous Corp., ISRWO, PCT/US2014/040648, dated Oct. 10, 2014, 11 pgs.
Energous Corp., IPRP, PCT/US2014/040648, dated Dec. 8, 2015, 8 pgs.
Energous Corp., ISRWO, PCT/US2014/049673, dated Nov. 18, 2014, 10 pgs.
Energous Corp., IPRP, PCT/US2014/049673, dated Feb. 9, 2016, 6 pgs.
Energous Corp., ISRWO, PCT/US2014/068282, dated Mar. 19, 2015, 13 pgs.
Energous Corp., IPRP, PCT/US2014/068282, dated Jun. 7, 2016, 10 pgs.
Energous Corp., ISRWO, PCT/US2014/068586, dated Mar. 20, 2015, 11 pgs.
Energous Corp., IPRP, PCT/US2014/068586, dated Jun. 14, 2016, 8 pgs.
Energous Corp., ISRWO, PCT/US2016/068504, dated Mar. 30, 2017, 8 pgs.
Energous Corp., ISRWO, PCT/US2016/068495, dated Mar. 30, 2017, 9 pgs.
Energous Corp., ISRWO, PCT/US2015/067287, dated Feb. 2, 2016, 8 pgs.
Energous Corp., IPRP, PCT/US2015/067287, dated Jul. 4, 2017, 6 pgs.
Energous Corp., ISRWO, PCT/US2016/068551, dated Mar. 17, 2017, 8 pgs.
Energous Corp., ISRWO, PCT/US2016/068498, dated May 17, 2017, 8 pgs.
Energous Corp., ISRWO, PCT/US2016/068993, dated Mar. 13, 2017, 12 pgs.
Encrgous Corp., ISRWO, PCT/US2016/068565, dated Mar. 8, 2017, 11 pgs.
Energous Corp., ISRWO, PCT/US2016/068987, dated May 8, 2017, 10 pgs.
Energous Corp., ISRWO, PCT/US2016/069316, dated Mar. 16, 2017, 15 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.5, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017. 5 pgs.
European Search Report, EP Patent Application No. 14868901.1, dated Jul. 7, 2017, 5 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43. No. 5. pp. 1318-1334.
Zhai, "A Practical wireless charging system based on ultra-wideband retro-reflective beamforniing" 2010 IEEE Antennas and Propagation Society International Symposium, Toronto, on 2010, pp. 1-4.
Mao: Beam Star: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24, 1994. Abstract.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antenna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.

\* cited by examiner

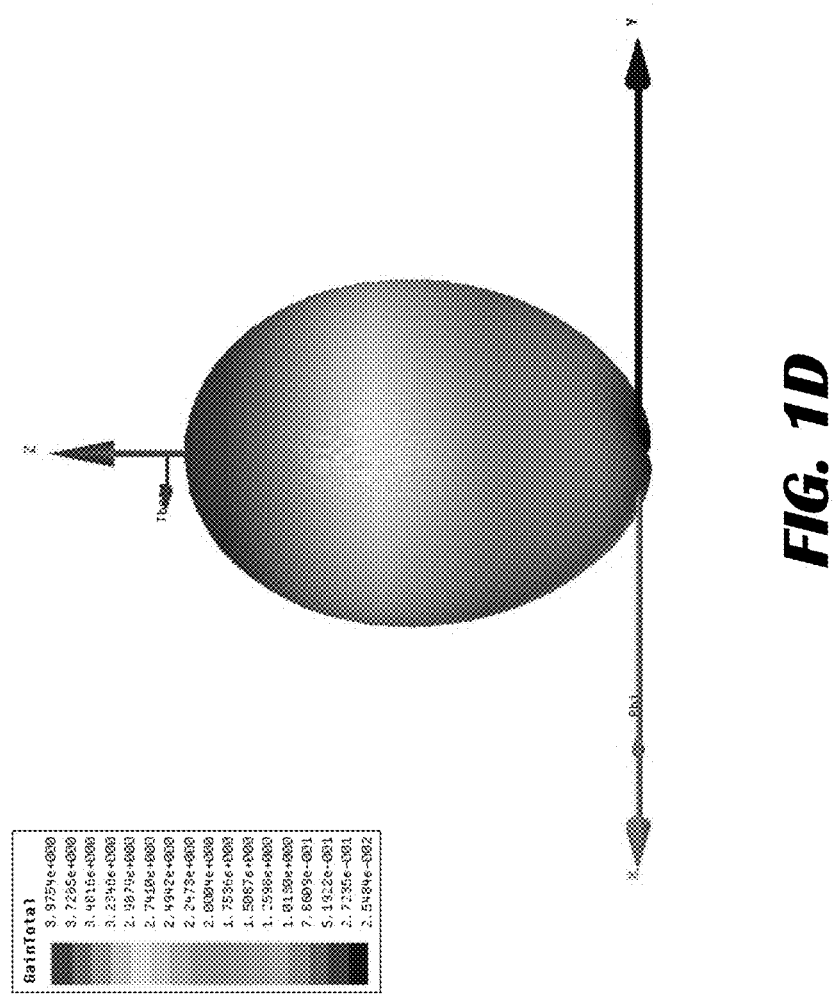

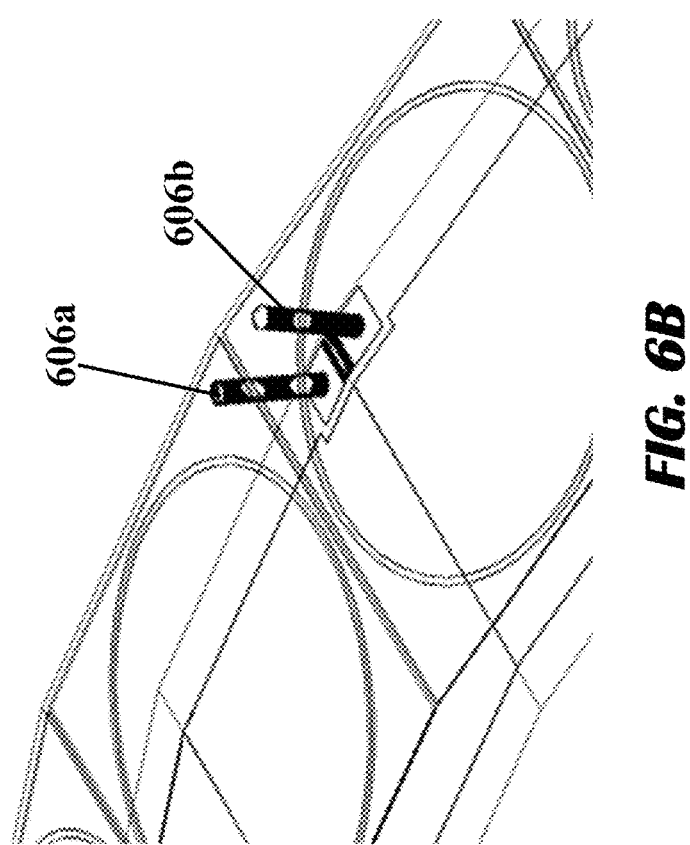

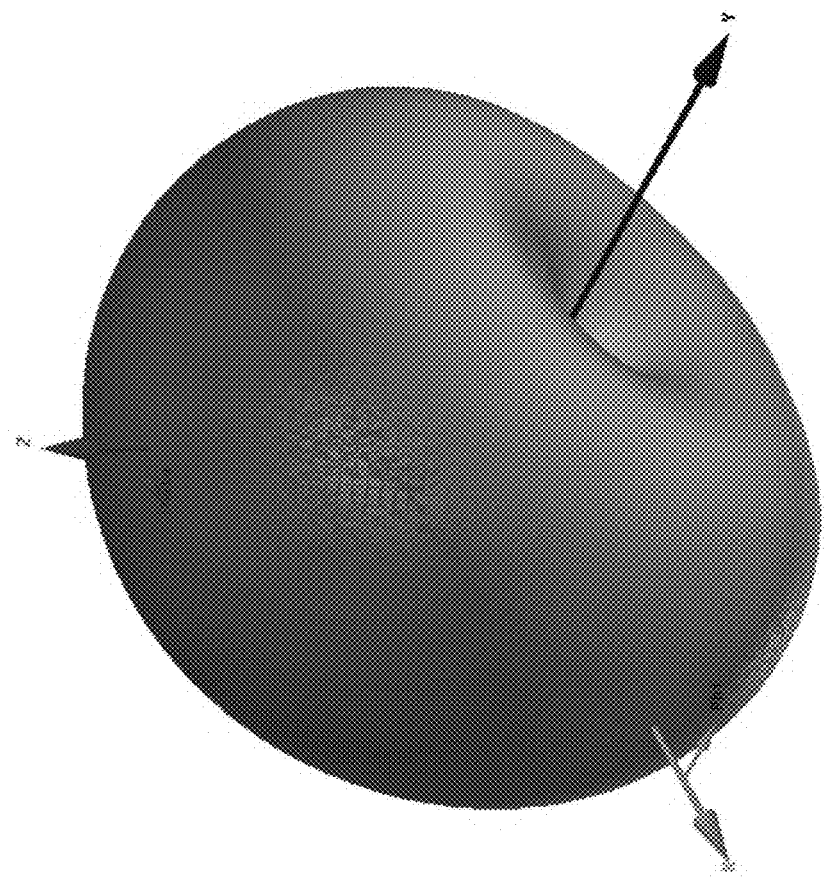
FIG. 8C
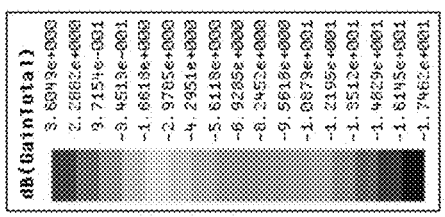

ANTENNA FOR WIRELESS CHARGING SYSTEMS

TECHNICAL FIELD

This application generally relates to wireless charging systems, and in particular, to metamaterial unit cells configured to radiate wireless power signals to power electronic devices.

BACKGROUND

Wireless charging systems have been made to wirelessly transmit energy to electronic devices, where a receiver device can consume the transmission and convert it to electrical energy. Wireless charging systems are further capable of transmitting the energy at a meaningful distance. The wireless charging systems make use of an array of antennas to provide spatial diversity, focus the wireless transmission waves at a target location, direction-finding, and increased capacity.

Numerous attempts have been made in new generation wireless charging systems to incorporate techniques to achieve high performance goals. The performance achievable by the new generation wireless charging systems is still limited due to a number of practical design factors including the design of the antenna array. The accommodation of the multiple antennas with large spacing in modern wireless charging systems has become difficult due to stringent space constraints in the new generation wireless charging systems. Typically, the dimensions of an antenna are determined by the frequency at which the antenna is designed to function. The ideal antenna is some multiple of the electromagnetic wavelength such that the antenna can support a standing wave. The antennas usually do not satisfy this constraint because antenna designers either require the antenna to be smaller than a particular wavelength, or the antenna is simply not allotted the required volume in a particular design in the new generation wireless charging systems. When the antenna is not at its ideal dimensions, the antenna loses efficiency. The antenna is also often used to capture information encoded on an electromagnetic wave. However, if the antenna is smaller than an incoming electromagnetic wavelength, the information is captured inefficiently and considerable power is lost. In order to meet such demanding design criteria, antenna designers have been constantly driven to seek better materials on which to build antenna systems for the new generation wireless charging systems.

In recent times, antenna designers have used metamaterials. Metamaterials are a broad class of synthetic materials that have been engineered to yield permittivity and permeability values or other physical characteristics, not found in natural materials, aligned with the antenna system requirements. It has been theorized that by embedding specific structures in some host media usually a dielectric substrate, the resulting material can be tailored to exhibit desirable characteristics. These promise to miniaturize antennas by a significant factor while operating at acceptable efficiencies.

In the context of antenna systems for the new generation wireless charging systems, metamaterials have been used as substrates or superstrates on existing antennas to enhance their properties. In current art, the metamaterial is usually integrated behind the antenna, either monolithically on the same PCB as the printed antenna, or as a separate structure in close proximity to the antenna. Alternatively, the metamaterial can be integrated on an already directive antenna to further enhance its directivity and gain. The benefit of integrating the metamaterial to the antenna enhances various properties of the antennas such as it creates one or more directive beams. It has been noted that certain metamaterials can transform an omnidirectional antenna into a very directive one while maintaining very thin profiles. However, due to the presence of a layer of antennas along with metamaterials layer, an optimal size and performance is not achieved by the metamaterial antenna systems for the new generation wireless charging systems. Accordingly, there is a need in the art for metamaterial antenna systems that provide an optimal size and performance for modern wireless charging systems having stringent space constraints.

SUMMARY

Metamaterials are artificial composites that achieve material performance beyond the limitation of uniform materials and exhibit properties not found in naturally-formed substances. Such artificially structured materials are typically constructed by patterning or arranging a material or materials to expand the range of electromagnetic properties of the material. When an electromagnetic wave enters a material, the electric and magnetic fields of the wave interact with electrons and other charges of the atoms and molecules of the material. These interactions alter the motion of the wave changing the electromagnetic wave propagation properties in the material, e.g., velocity, wavelength, direction, impedance, index of refraction, and the like. Similarly, in a metamaterial, the electromagnetic wave interacts with appropriately designed artificial unit cells that macroscopically affect these characteristics. In an embodiment, the metamaterial may comprise an array of unit cells formed on or in a dielectric substrate and are configured to radiate wireless power signals to power electronic devices.

In one embodiment, a wireless transmission apparatus comprises a metamaterial unit cell. The metamaterial unit cell may include a surface having a metal patch with an aperture. The aperture is defined such that a periphery of the aperture is within a periphery of the surface by a spacing distance. An antenna element is disposed within the aperture.

In another embodiment, a method of forming a unit cell is provided. The method comprises forming a metamaterial layer using metamaterial substrate. A surface on the metamaterial layer may be created, and a metal patch with an aperture in the surface of the metamaterial layer may be created. An antenna element may be disposed in the aperture to form the unit cell.

In another embodiment, a metamaterial system (or a metamaterial board) of a wireless transmission apparatus comprises a metamaterial layer. The metamaterial layer may include an array of metamaterial unit cells, where each of the metamaterial unit cells may include a surface having an aperture. The aperture is defined such that a periphery of the aperture is within a periphery of the surface by a spacing distance. An antenna element is disposed within the aperture. The metamaterial system may further include at least one input RF port disposed on a backing layer that is positioned below the metamaterial layer such that there is no short-circuit between the conductive backing layer and the metamaterial layer. At least one set of vias may connect the array of metamaterial unit cells with the input RF port(s).

In another embodiment, a method of forming a metamaterial system is provided. The method comprises forming a backing layer. A metamaterial layer may be formed from a metamaterial substrate. The metamaterial layer may be formed above the backing layer. Multiple partitions may be created in the metamaterial layer, where each of the partitions define a portion of a unit cell of a plurality of unit cells. The method further includes creating an aperture in each of the partitions, where the aperture is defined such that a periphery of the aperture is within a periphery of a partition in which the aperture is created by a spacing distance. An element may be disposed in the aperture in each of the plurality of partitions. At least one input RF port may be formed on the backing layer such that there is no short-circuit between the backing layer and the metamaterial layer. The unit cells may be connected with the input RF port(s) by at least one set of vias.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings constitute a part of this specification and illustrate an embodiment of the invention and together with the specification, explain the invention.

FIG. 1D illustrates a profile view of a radiation gain pattern in linear scale of a metamaterial board having a contactless capacitive coupling mechanism of FIG. 1A, according to an exemplary embodiment.

FIG. 6B illustrates an enlarged sectional view of a metamaterial unit cells as wearable antennas, according to an exemplary embodiment.

FIG. 8C illustrates an isometric view of a radiation gain pattern of a metamaterial board configured as an antenna array of FIG. 8A, according to an exemplary embodiment.

DETAILED DESCRIPTION

Figure 1A:
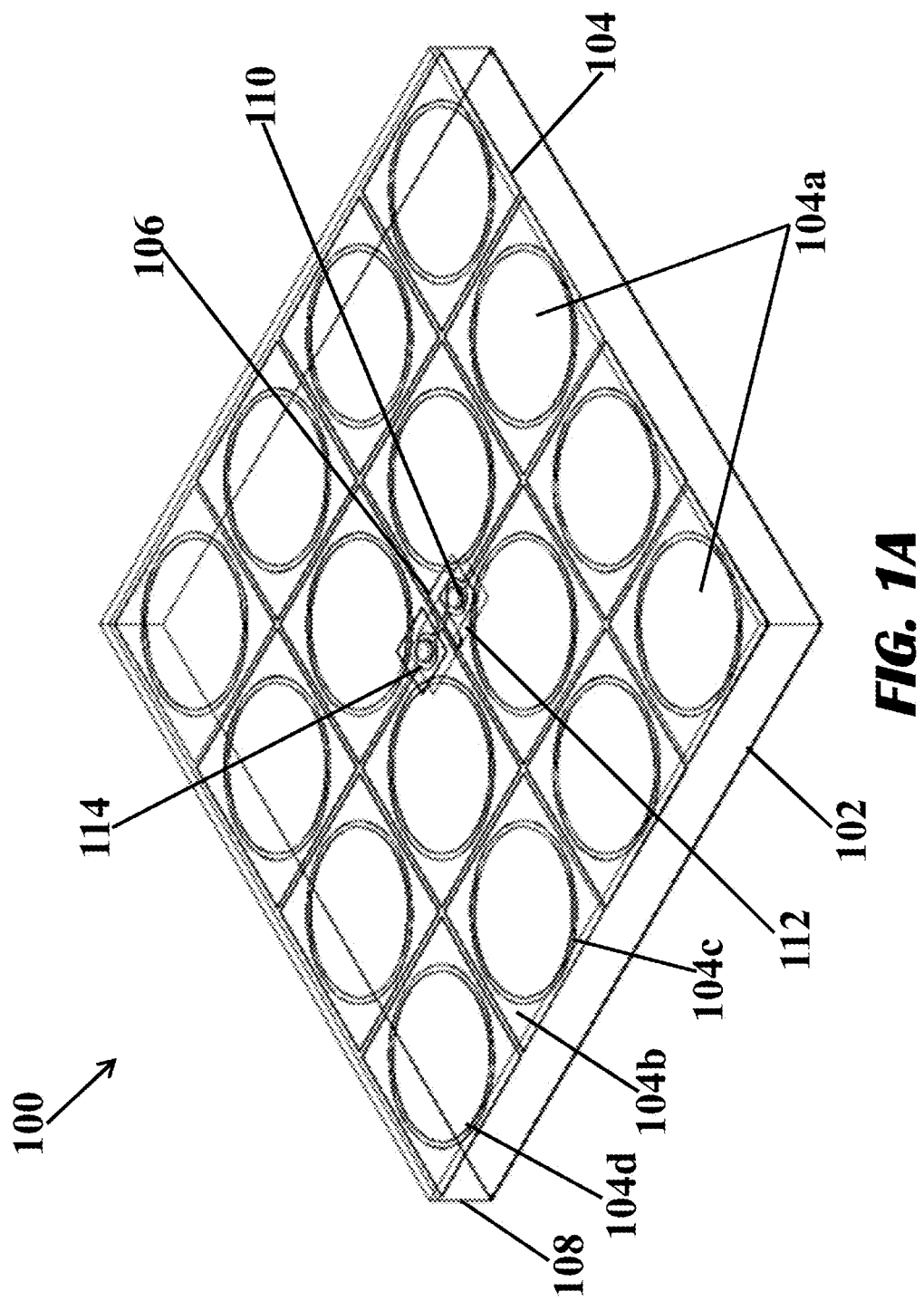
FIG. 1A illustrates an isometric view of a structure of a metamaterial board having a contactless capacitive coupling mechanism, according to an exemplary embodiment.

The present disclosure is herein described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

In an embodiment, a response of a structure in any material to electromagnetic waves may be described by overall parameters, such as permittivity and permeability of the material, where the dimensions of the structure are far smaller than the wavelength of the electromagnetic wave. The permittivity and the permeability at each point of the material may be the same or different, so that the overall permittivity and the overall permeability of the material are distributed regularly to some extent. The regularly distributed permeability and permittivity can cause the material to exhibit a macroscopic response to the electromagnetic wave, for example, converging the electromagnetic wave, diverging the electromagnetic wave, and the like. Such a material with regularly distributed permeability and permittivity is called metamaterial. In other words, metamaterials are a broad class of synthetic materials that are engineered to yield permittivity and permeability characteristics compliant with the system requirements. By embedding specific structures, usually periodic structures, in some host media, usually a dielectric substrate, the resulting material is tailored to exhibit desirable characteristics. These metamaterials enable miniaturizing antennas by a significant factor while operating at acceptable efficiencies. The metamaterials may also convert omnidirectionally radiating antennas into directively radiating antennas.

In an embodiment, metamaterials of the present disclosure do not need an additional layer of antennas for the metamaterials to radiate. The metamaterials radiate on their own, and at the same time, the metamaterials maintain the properties of a traditional antenna-type metamaterials. In other words, the metamaterials act as very thin reflectors, and at the same time, the metamaterials do not need antennas for radiating as the metamaterials radiate themselves.

In an embodiment, the metamaterials of the present disclosure work like artificial magnetic conductors. The metamaterials are configured as very thin reflectors, and therefore the metamaterials are easy to integrate in very thin profiles of products, such as wearable bracelets.

In an embodiment, there is provided a metamaterial system (also referred as metamaterial board) that comprises at least two metal layers and a thin substrate. The structure of the metamaterial system of the present disclosure provides for no antenna placement layers in relation to prior art implementations that require at least three metallization layers because of the additional antenna layer for the placement of antennas. Further, the metamaterial system of the present disclosure is much thinner in size than the prior art implementations as absence of additional antenna layers, often at prescribed non-negligible distances from the ordinary metamaterials, reduce significantly the overall system thickness that incorporates the metamaterial system. Therefore, the metamaterial system of the present disclosure due to absence of any layer of antennas results in very thin profiles, and is appropriate for dense integration at reduced cost.

In an embodiment, there is provided a metamaterial system composed of several sub-wavelength-sized "artificial atoms" or radiative metamaterial unit cells. The metamaterial system operates by electromagnetically exciting all of the radiative metamaterial unit cells simultaneously. The metamaterial system also have many degrees of freedom that may translate into beam-forming possibilities that are unavailable with a conventional single antenna. In one example, some regions of the metamaterial system contain the radiative metamaterial unit cells that have different design and radiative properties than other regions of the same metamaterial system. The radiative metamaterial unit cells facilitate creation of beam-forming and/or beam steering without introduction of any phase-shifting networks.

In an embodiment, there is provided a metamaterial system composed of several radiative metamaterial unit cells. The metamaterial system may obtain linear, circular or elliptical polarization by appropriately designing the radiative metamaterial unit cells. The linear, circular or elliptical polarization properties may be obtained by the metamaterial system that is composed of regions of the radiative metamaterial unit cells, where each of the radiative metamaterial unit cell has a different design with respect to other metamaterial unit cells. In other words, since the radiative metamaterial unit cells radiate on their own, designing the radiative metamaterial unit cells appropriately may obtain various different functionalities, such as linear, circular, circular, or elliptical polarization.

In an embodiment, there is provided a metamaterial system composed of radiative metamaterial unit cells. The radiative metamaterial unit cells may be electrically interconnected by switches realized by integrated diodes, RF microelectromechanical (MEM) devices, or other means, to form larger radiative domains or different metamaterial "super-cells" that scan selected frequencies of operation over which the electromagnetic radiation is desired.

In an embodiment, there is provided a metamaterial system composed of an array of unit cells. The array of unit cells radiate on their own and have engineered metamaterials. In one implementation, an array of switches may be constructed by connecting adjacent unit cells of the array of unit cells. In other words, the metamaterial system is composed of a lattice of unit cells, and a lattice of switches can be manufactured by connecting adjacent unit cells through diodes. The lattice of switches may be superimposed on the lattice of the unit cells, and because the switches connect adjacent unit cells electronically, there may be a configuration where the metamaterial has two types of unit cells, one type of unit cells that are not connected, and the other type of unit cells where a pair of unit cells are connected. In the latter case, the electrical size may be variable according to whether the switches are open or closed. In this configuration, the frequency may be varied according to whether or not the switches to connect adjacent unit cells. This is also called smart radiative metamaterials, where the frequency tuning is arranged through the connectivity of the switches.

In an embodiment, there is provided a metamaterial system composed of radiative metamaterial unit cells. The metamaterial unit cells are extremely small in size due to which resulting metamaterial antennas occupy small form factors and are ideally suited to follow the curved shapes of wearable and other conformal applications. In other words, the form factors are proportional to the size of the metamaterial unit cells. Due to smaller size, the metamaterial unit cells may be placed on flexible/wearable substrates to realize wearable antennas or antennas in curved geometries.

In an embodiment, there is provided a metamaterial system that is composed of several radiative metamaterial unit cells. The metamaterial unit cells are extremely small in size due to which there are smaller form factors, and because of the small form factors, the radiative metamaterial unit cells may be placed in closely spaced orthogonal orientations, and thus forming dual linearly-polarized antenna systems that are able to transmit or receive electromagnetic waves simultaneously in orthogonal linear polarizations. The simultaneous transmission and receiving of the electromagnetic waves in orthogonal linear polarizations can be realized within very small areas, such as curved wearable platforms (e.g., wearable bracelets).

In an embodiment, there is provided a metamaterial system that is composed of radiative metamaterial unit cells. The radiative metamaterial unit cells in a receiving mode operate as uniform materials that absorb electromagnetic radiation with high absorption efficiency. The radiative metamaterial unit cells may further operate over a wide range of frequencies, including a microwave spectrum. The radiative metamaterial unit cells have a very high absorption efficiency (90% or higher). In another embodiment, the radiative metamaterial unit cells may be tapped by inserting localized radio frequency (RF) ports to arbitrary metamaterial unit cells. This power is then directed specifically to these RF ports. Thus, the radiative metamaterial unit cells work as a dense antenna array with many RF ports that receive the absorbed energy. Such metamaterial system is ideal for very small receivers, where the received power may be distributed to multiple channels simultaneously. A high density of the RF ports may be achieved, with each such RF port tapping adjacent radiative metamaterial unit cells. An even higher density of the RF ports may be achieved, with some RF ports tapping the same radiative metamaterial unit cell, provided additional decoupling techniques are employed. In addition, these multiple densely placed RF ports can accept phase control, resulting in electronically modulated RF patterns.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

FIG. 1A illustrates an isometric view of a structure of a metamaterial board 100 having a contactless capacitive coupling mechanism, according to an exemplary embodiment. The metamaterial board 100 illustrated here is realized in standard Printed Circuit Board (PCB) technology utilizing three metal layers. Three metal layers may include a conductive backing layer 102, a metamaterial layer 104, and a coupling layer 106. Also, a dielectric layer 108 is disposed between the conductive backing layer 102 and the metamaterial layer 104.

In the metamaterial board 100 fabrication, the conductive backing layer 102 is placed at the bottom of the structure of the metamaterial board 100. The metamaterial layer 104 may be deposited above the conductive backing layer 102, and then may be etched to create an array of metamaterial unit cells 104a. Hereinafter, the term "unit cell" and "metamaterial unit cell" may be interchangeably used. In an embodiment, a distance between the conductive backing layer 102, and the metamaterial layer 104 is such that there is no short-circuit between the conductive backing layer 102, and the metamaterial layer 104 in order to make the metamaterial unit cells 104a radiate. Below the metamaterial layer 104 and above the conductive backing layer 102 may be deposited a layer of dielectric 108 or insulating material, often a silicon dioxide.

The metamaterial layer 104 comprises the array of unit cells 104a. In the illustrative figure, the metamaterial layer 104 of the metamaterial board 100 comprises sixteen radiative metamaterial unit cells 104a in a four-by-four (4×4) arrangement. Each of the metamaterial unit cell 104a may include a surface. In one embodiment, the surface may be a substantially flat surface. In another embodiment, the surface may not be a flat surface or a substantially flat surface. The substantially flat surface of each of the array of metamaterial unit cells 104a may be a square surface containing a square metal patch 104b with an aperture 104c inscribed within it. The square metal patch 104b does not completely fill the metamaterial unit cell surface, but is slightly smaller than the metamaterial unit cell. The aperture 104c is defined such that a periphery of the aperture 104c is within a periphery of the square metal patch 104b by a spacing distance. In one example, the aperture 104c may be a circular aperture. An element 104d may be disposed within the aperture 104c to form a circular slot. In another example, the aperture may be a narrow shaped circular slot formed by the circular shape aperture 104c and the element 104d disposed within it. In the illustrated embodiment, since the aperture 104c is circular in shape, the element 104d is a circular metal disk that is disposed within aperture 104c to form the circular slot. It will be appreciated by a person having ordinary skill in the art that the shape of the aperture 104c is not limited to circular shape, and the aperture 104c may be of any other suitable shape without moving out from the scope of the disclosed embodiments. Also, the array composed of metamaterial unit cells 104a contains square metal patches that do not touch each other, but are separated by narrow straight slots, since the metamaterial unit cell surface is slightly larger than that of the square metal patch 104b inscribed therein. Further, there is a thin slot separating the circular element 104d from the periphery of the square metal patch 104b. In an embodiment, one subset of the array of the metamaterial unit cells 104a may be of one shape and size, and another subset of the array of the metamaterial unit cells 104a may be of another shape and size.

In one embodiment, one metamaterial unit cell 104a on its own does not radiate efficiently and also does not match the required impedance value. In other words, one metamaterial unit cell 104a does not have properties for a standard antenna. The array or the collection of the metamaterial unit cells 104a work together as an antenna. Therefore, the metamaterial board 100 may include 16 unit cells 104a. However, it is to be noted that the metamaterial board 100 may comprise any number of unit cells 104a in other embodiments without moving out from the scope of the disclosed embodiments.

In another embodiment, the metamaterial layer 104 may comprise the array of unit cells 104a formed on or in a dielectric substrate. In some embodiments, the metamaterial layer 104 may comprise a stack of 2D arrays of unit cells 104a, where each 2D array of unit cells 104a is formed on or in a respective dielectric substrate. In this implementation, magnetic permeability enhanced metamaterials are constructed by stacking up the unit cells 104a that can store magnetic energy by virtue of their structure. The unit cell 104a in embodiments of the present disclosure is composed of the circular element 104d and the square metal patch 104b, where the circular element 104d may be embedded in a dielectric material. The magnetic energy storage is created in the unit cell 104a when a magnetic field passes normally to the plane of the circular element 104d and inducing a current in the loop.

The dielectric layer 108 may be masked and etched to open narrow profile openings known as vias 110. Each of the vias 110 respectively extend as an opening through the dielectric layer 108 to a portion of the uppermost coupling layer 106. In one embodiment, the vias 110 may be present to provide electrical paths between different metal layers of the metamaterial board 100. The vias 110 may run from a surface of the metamaterial board 100 through each of the layers of the metamaterial board 100. In another embodiment, the vias 110 may run from one layer of the metamaterial board 100 or a surface of the metamaterial board 100 and through other layers of the metamaterial board 100 but stop short of running through one of the layers. At a first surface of the metamaterial board 100, the vias 110 may terminate on bond pads that couple to the integrated circuit. An opposite surface of the metamaterial board 100 is to be coupled to a PCB. As discussed above, certain vias 110 may go entirely through entire core of the metamaterial board 100. Other vias 110 may be isolated vias 110, which are present through only a portion of the metamaterial board 100. The particular layering and the vias 110 pattern configuration utilized is a matter of design choice involving several factors related to the purposes to be served by the particular metamaterial board 100. In order to form the metamaterial board 100 with the vias 110 as described above, once a pattern of the vias 110 to traverse the layers is determined, these particular vias 110 may be machine drilled, punched, or etched through the layers. Alternative techniques for providing electrical paths between the layers may be utilized.

In the illustrated figure, the vias 110 extend from the uppermost coupling layer 106 to input RF ports 112. The input RF ports 112 may be located on or behind the conductive backing layer 102. The input RF ports 112 may include a housing having any arbitrary shape, and manufactured from plastic, metal, or any other convenient material. The input RF ports 112 may be configured such that two or more submodules may be removably located within or attached to housing. That is, the submodules are removably coupled electrically, and may be removably inserted within housing. In an alternate embodiment, the submodules are removably attached to the exterior of housing. The input RF ports 112 are not limited to two submodules, and may be configured to accommodate 3, 4, or even more such submodules. The submodules may include a variety of electrical components that communicate via RF energy. In general, the submodules are capable of fulfilling many of the functions of the components.

In another embodiment, another layer of metal may be deposited over the dielectric layer 108. The deposited metal fills the vias 110, forming metallic contact structures engaging the exposed underlying metal at the bottom of the vias and making points of contact through layer between the conductive backing layer 102 and the uppermost coupling layer 106. The geometries of the vias 110 and the contact structures that now fill the vias 110 are usually circular, although the vias 110 may also form other shapes such as a trench shape. The vias 110 have been positioned so that the metallic structures which fill the vias 110 provide contacts between two separated metal layers of the metamaterial board 100.

In an embodiment, the contactless capacitive coupling excitation mechanism is used to excite the structure of the metamaterial board 100. Some of the components utilized for the contactless capacitive coupling excitation mechanism are provided above the metamaterial layer 104 at the center of the metamaterial board 100 to excite the structure of the metamaterial board 100. The components at least include a plurality of pads 114 on the coupling layer 106. The plurality of pads 114 are used to excite the metamaterial unit cells of the metamaterial board 100. The plurality of pads 114 are connected through the vias 110 that traverse though the metamaterial layer 104 of the metamaterial board 100 up to the conductive backing layer 106 of the metamaterial board 100. In the present embodiment, the excitation of the metamaterial unit cells of the metamaterial layer 104 is achieved without direct contact by a capacitive structure (of small size) that couples RF power from the input RF port 112 to the metamaterial layer 104. Also, the plurality of pads 114 (of square shape) placed above the metamaterial layer 104, and going through the vias 110 behind the structure of the metamaterial board 100 excite the metamaterial unit cells as a capacitor, and therefore such a coupling is called the capacitive coupling. The contactless capacitive coupling excitation mechanism enables three metal layers of the metamaterial board 100. In alternate embodiments described further herein, the excitation of the metamaterial board 100 may utilize fewer than or more than three metal layers.

In an embodiment, the two vias 110 connect to the RF port 112, and therefore have a positive polarity and a negative polarity. One of the vias 110 at a negative potential is configured to excite half of the metamaterial unit cells 104a, and the other of two vias 110 at a positive potential is configured to excite remaining half of the metamaterial unit cells 104a. In the contactless capacitive coupling mechanism, a single via 110 with the corresponding pad 114 excites the adjacent metamaterial unit cells 104a of the metamaterial board 100 simultaneously because of a finite size of the corresponding pad 114 and since the corresponding pad 114 couples to both of the adjacent metamaterial unit cells 104a equally.

In illustrative embodiment, the metamaterial unit cell 104a is a square surface surrounding the square metal 104b comprising the aperture, and the metallic element 104d disposed within the aperture 104c. The metallic element 104d is a circular metal disk that has a smaller diameter than the aperture 104c. The size of the aperture 104c is inversely proportional to a frequency of operation. If the size of the aperture 104c is reduced, the size of the metallic element 104d disposed within the aperture 104c is also reduced, and then the frequency of the operation moves up. If the size of the aperture 104c is increased, the size of the metallic element 104d disposed within the aperture 104c also becomes larger, and then the frequency at which the metamaterial unit cell 104a operates goes down. The aperture 104c may be of circular shape. In an alternate embodiment, the aperture 104c may be of an elliptical shape. Alternate shapes may be utilized.

In illustrative embodiment, the radiating structure of the metamaterial board 100 is linearly polarized, and has a transmit mode and a receive mode. In the transmit mode/configuration, the radiating structure of the metamaterial board 100 emits radiation where the electric field has a specific direction along a single line. In the receive mode/configuration, the radiating structure of the metamaterial board 100 receives the radiation.

Figure 1B:
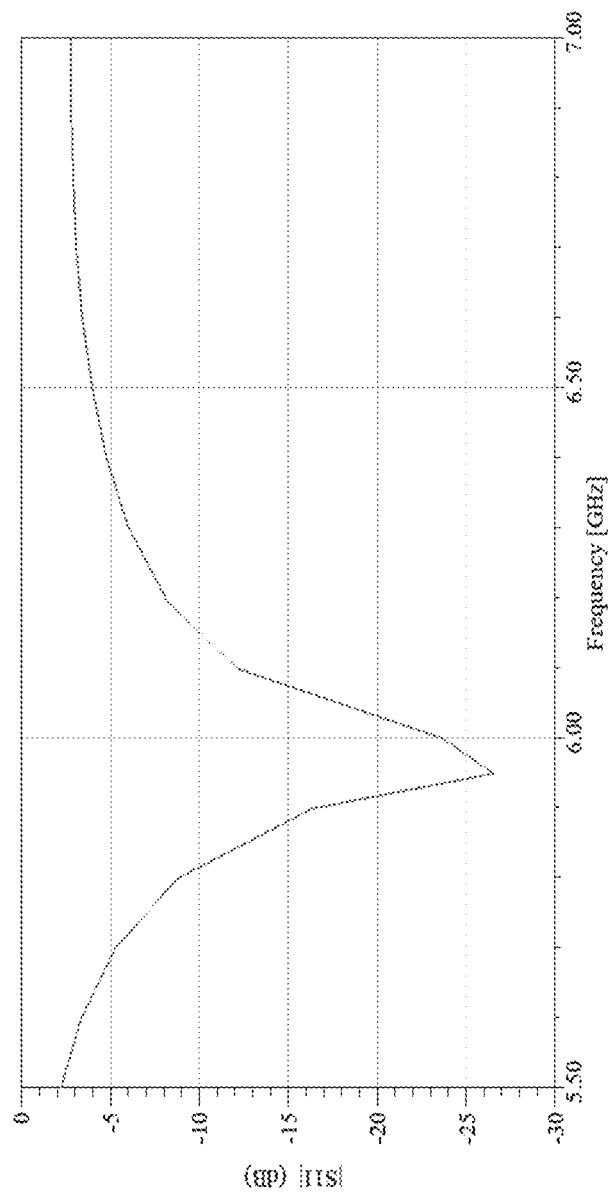
FIG. 1B illustrates a graph depicting a return loss of a metamaterial board having a contactless capacitive coupling mechanism of FIG. 1A, according to an exemplary embodiment.

FIG. 1B illustrates a graph depicting the return loss of a metamaterial board 100 having a contactless capacitive coupling mechanism of FIG. 1A, according to an exemplary embodiment. The return loss (reflected power) of the metamaterial board 100 having the contactless capacitive coupling is measured in dB. The metamaterial board 100 having the contactless capacitive coupling mechanism resonates at a center frequency of 6 GHz. The impedance matching here to a 50 Ohm RF port is at below −25 dB. The impedance matching represents matching of the metamaterial board 100 having the contactless capacitive coupling mechanism to a standard RF port, which is typically 50 ohm. The impedance matching bandwidth at the −10 dB level is 350 MHz, or 6% with respect to a center frequency of the metamaterial board 100. The impedance matching defines the operation frequency band of the structure of the metamaterial board 100 having the contactless capacitive coupling mechanism. In one embodiment, the dimensions of the metamaterial board 100 having the contactless capacitive coupling mechanism may be chosen so that the metamaterial board 100 having the contactless capacitive coupling mechanism tune to a standard operation frequency around 500 GHz. In another embodiment, impedance matching to other RF port values is possible with modifications of the presented shapes without moving out from the scope the disclosed embodiments.

Figure 1C:
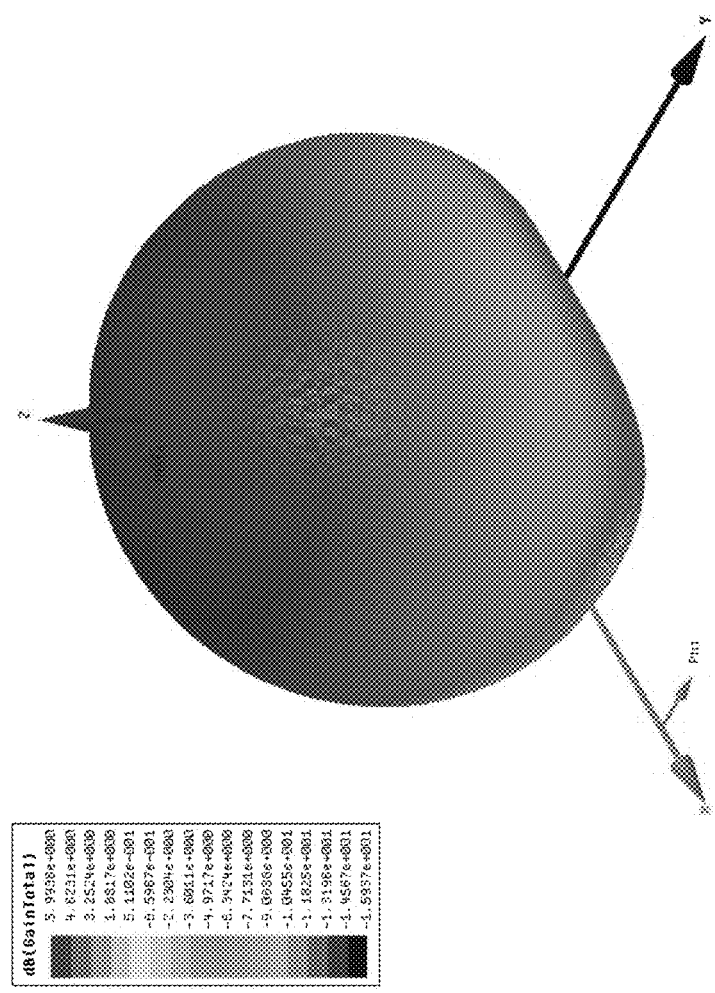
FIG. 1C illustrates an isometric view of a radiation gain pattern of a metamaterial board having a contactless capacitive coupling mechanism of FIG. 1A, according to an exemplary embodiment.

FIG. 1C illustrates an isometric view of a radiation gain pattern, in dB, of a metamaterial board 100 having a contactless capacitive coupling mechanism of FIG. 1A, according to an exemplary embodiment. As shown, the metamaterial board 100 having the contactless capacitive coupling mechanism has a single directive electromagnetic beam of energy that is radiating upward/forward along the z-axis. The single directive electromagnetic beam is generated by excitation of entire sixteen metamaterial unit cells 104a of the metamaterial board 100.

FIG. 1D illustrates a polar plot of a radiation gain pattern in linear scale of a metamaterial board 100 having a contactless capacitive coupling of FIG. 1A, according to an exemplary embodiment. As shown, the metamaterial board 100 having the contactless capacitive coupling mechanism has a single directive electromagnetic beam of energy that is directed broadside, with negligible radiation behind the metamaterial board 100. The single directive electromagnetic beam is generated by excitation of entire sixteen metamaterial unit cells 104a of the metamaterial board 100.

Figure 1E:
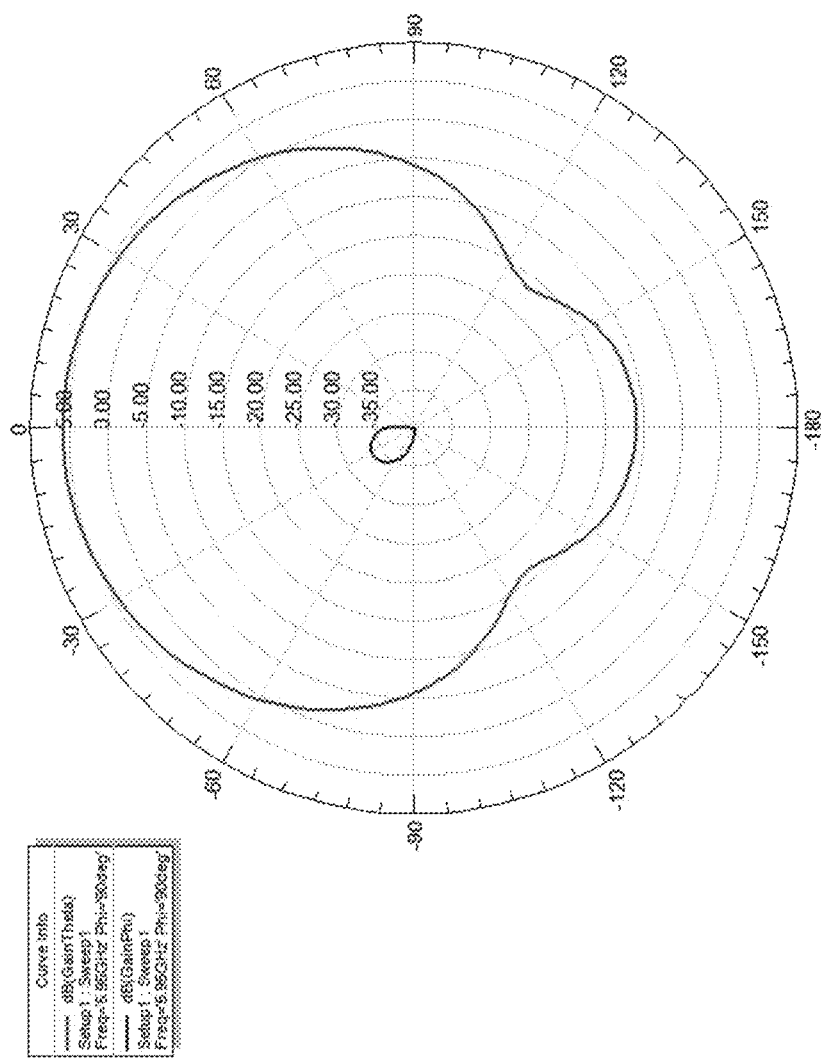
FIG. 1E illustrates a polar plot of a radiation gain pattern on a principal Y-Z plane of a metamaterial board having a contactless capacitive coupling mechanism of FIG. 1C, according to an exemplary embodiment.

FIG. 1E illustrates a polar plot of a radiation gain pattern, in dB, on a principal Y-Z plane of a metamaterial board 100 having a contactless capacitive coupling of FIG. 1C, according to an exemplary embodiment. The electromagnetic radiation emitted from the metamaterial board 100 having the contactless capacitive coupling mechanism is linearly polarized, with a cross-polarization level at about 40 dB below a co-polarized radiation. In an embodiment, the metamaterial board 100 back-side radiation is suppressed and a front-to-back gain ratio is about 17 dB.

Figure 1F:
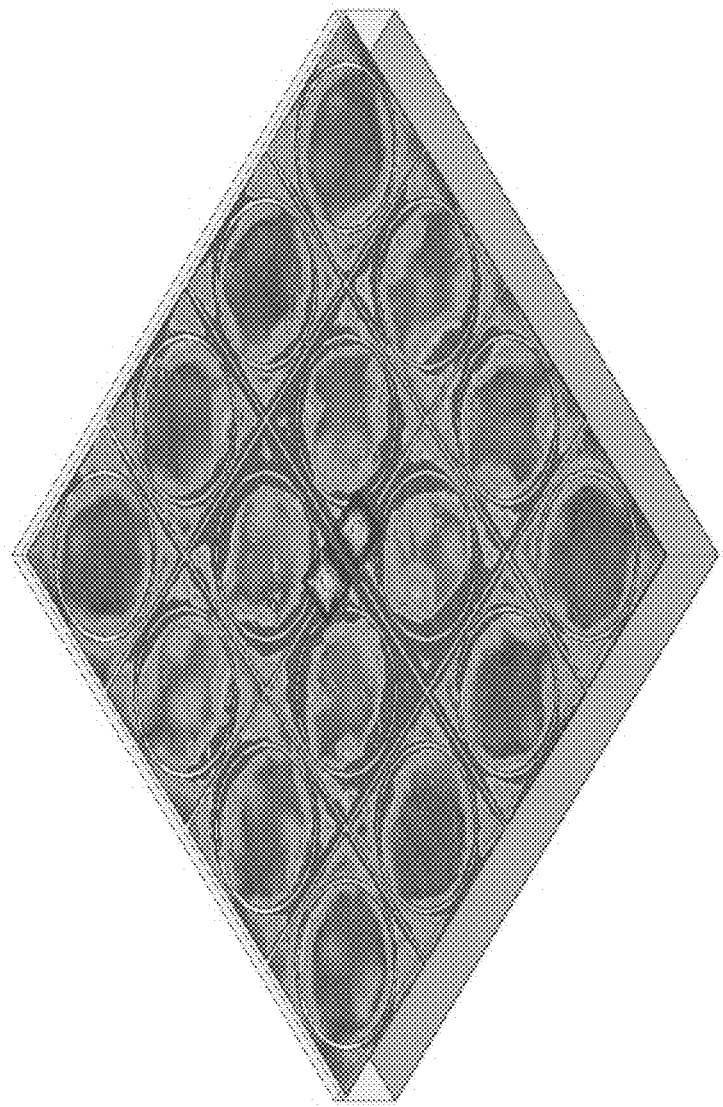
FIG. 1F illustrates a magnitude of electric current surface density distribution on metamaterial cells layer of a metamaterial board having a contactless capacitive coupling mechanism of FIG. 1A at operational frequencies, according to an exemplary embodiment.

FIG. 1F illustrates a magnitude of electric current surface density distribution on metamaterial unit cells layer 104 of a metamaterial board 100 having a contactless capacitive coupling mechanism of FIG. 1A at operational frequencies, according to an exemplary embodiment. The magnitude of the electric current surface density distributed on the radiative metamaterial unit cells 104a of the metamaterial board 100 having the contactless capacitive coupling mechanism, at the operating frequency band, where the metamaterial unit cells 104a of the metamaterial board 100 radiates is shown. In one embodiment, a plurality of metamaterial unit cells 104a of the metamaterial board 100 are excited from the contactless capacitive coupling mechanism and subsequently strong electric currents develop both on square patch edges and on circular slot edges of each of the metamaterial unit cells 104a of the metamaterial board 100. This results in the plurality of metamaterial unit cells 104a of the metamaterial board 100 contributing to the electromagnetic radiation simultaneously, thereby leading to a high radiative gain of the metamaterial board 100. In another embodiment, all the metamaterial unit cells 104a of the metamaterial board 100 are excited from the contactless capacitive coupling mechanism due to strong electric currents that develop both on the square patch edges and on the circular slot edges of each of the metamaterial unit cells 104a of the metamaterial board 100. In this embodiment, all the metamaterial unit cells 104a of the metamaterial board 100 contributing to the electromagnetic radiation simultaneously, thereby leading to a high radiative gain of the metamaterial board 100. It is contemplated that an alternate embodiment may actively or passively engage a plurality, but not all, metamaterial unit cells 104a to contribute to the electromagnetic radiation. In an embodiment, although the excitation of the metamaterial unit cells 104a of the metamaterial board 100 is localized at the center of the metamaterial board 100 using the contactless capacitive coupling mechanism, however as shown in the figure, the electric current spreads on all of the metamaterial unit cells 104a of the metamaterial board 100 in order for radiation to occur. In an alternate embodiment, the excitation of the metamaterial unit cells 104a of the metamaterial board 100 may be localized at any location of the metamaterial board 100 using the contactless capacitive coupling mechanism such that the electric current spreads on the plurality of the metamaterial unit cells 104a of the metamaterial board 100 in order for radiation to occur.

In an embodiment, in order for radiation to occur, the metamaterial board 100 using the contactless capacitive coupling mechanism results in more than one metamaterial unit cell 104a being excited for radiation to happen. In such a case, the multiple metamaterial unit cells 104a of the metamaterial board 100 has properties to work as a standard antenna. In an alternate embodiment, in order for radiation to occur, the metamaterial board 100 using the contactless capacitive coupling mechanism may have only a single metamaterial unit cell 104a that may be excited for radiation to happen. In such a case, the single metamaterial unit cell 104a has properties to work as a standard antenna.

Figure 1G:
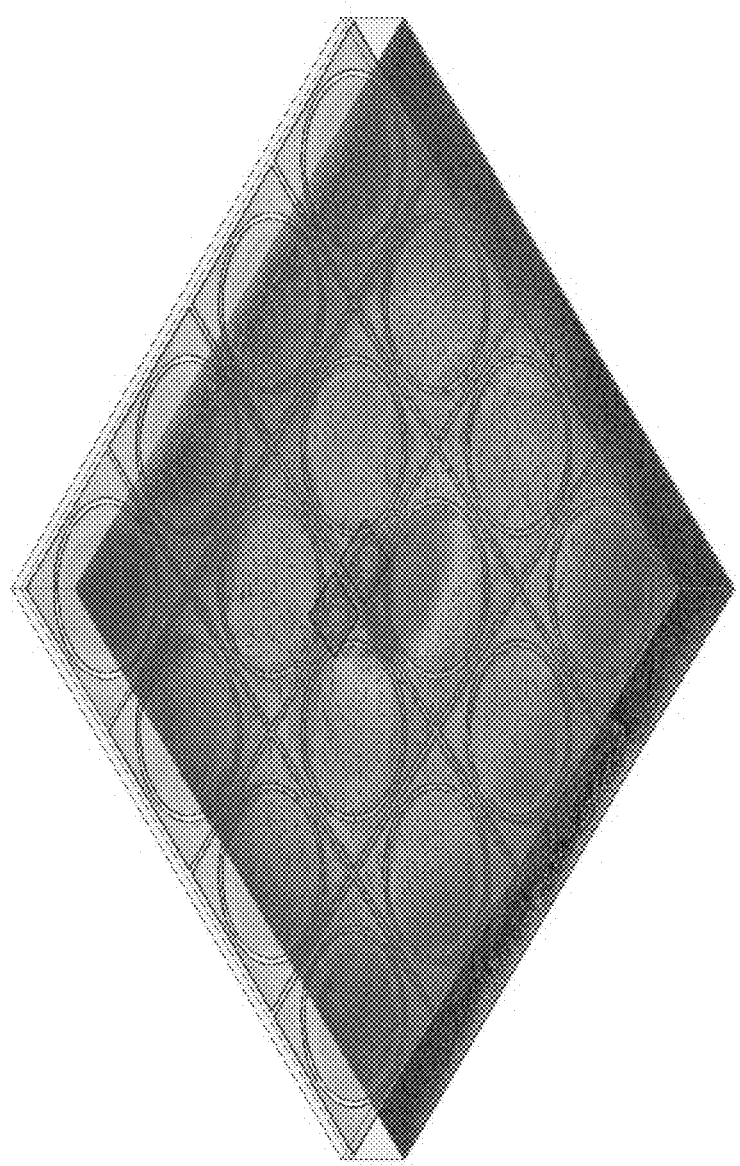
FIG. 1G illustrates a magnitude of electric current surface density distribution on backing conductor layer of a metamaterial board having a contactless capacitive coupling mechanism of FIG. 1A at operational frequencies, according to an exemplary embodiment.

FIG. 1G illustrates a magnitude of electric current surface density distribution on a backing conductor layer 102 of a metamaterial board 100 having a contactless capacitive coupling mechanism of FIG. 1A at operation frequencies, according to an exemplary embodiment. As shown, the electric current concentrates at the center of the conductive backing layer 102 of the metamaterial board 100, and thereby creating a focusing effect that directs the electromagnetic power radiated by the metamaterial unit cells 104*a* of the metamaterial board 100 in an upward direction, that is, along the z-axis.

Figure 2:
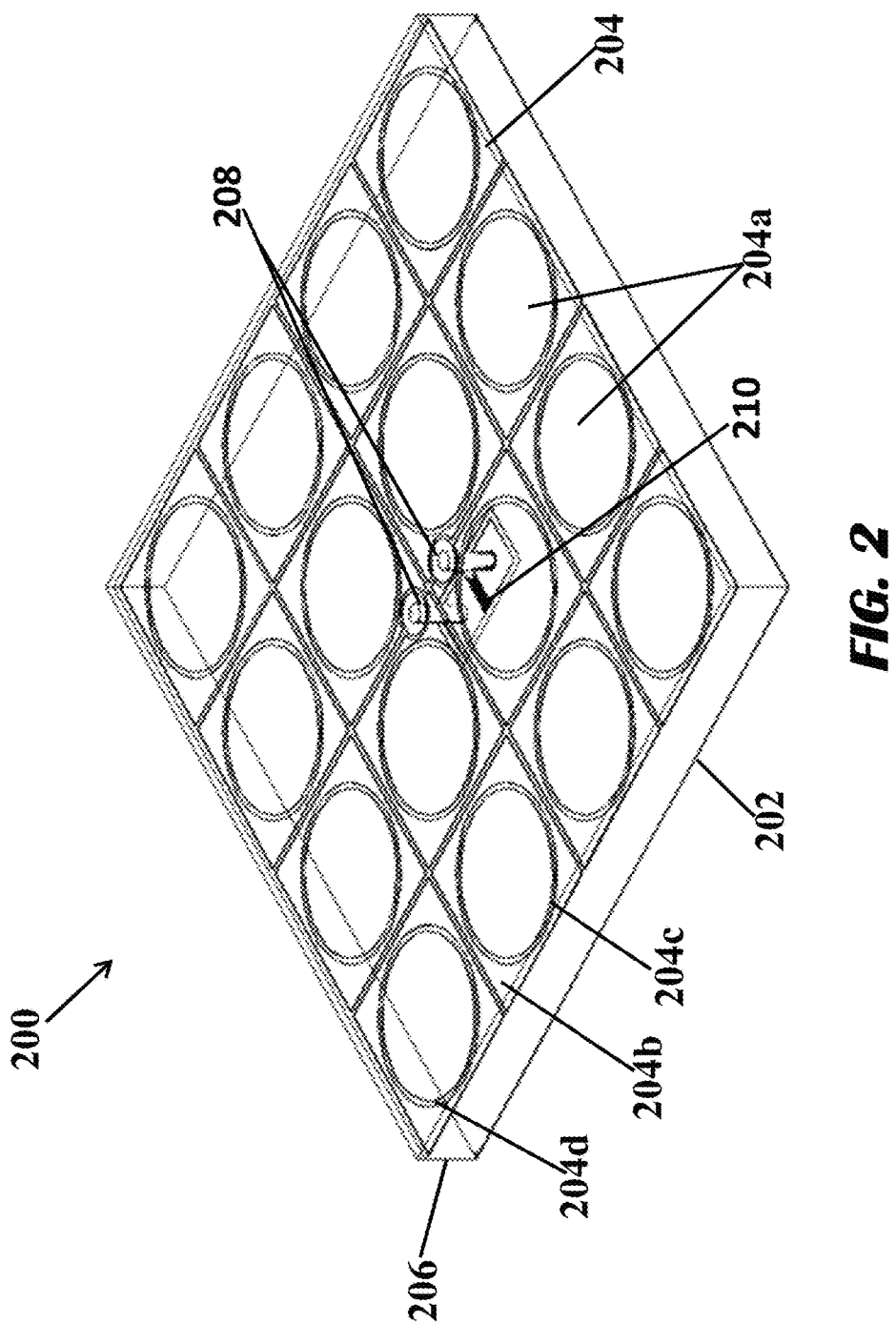
FIG. 2 illustrates an isometric view of a structure of a metamaterial board having a co-planar coupling mechanism, according to an exemplary embodiment.

FIG. 2 illustrates an isometric view of a structure of a metamaterial board 200 having a co-planar coupling mechanism, according to an exemplary embodiment. In this embodiment, the co-planar coupling mechanism is used to excite an array of metamaterial unit cells of the metamaterial board 200. The co-planar coupling mechanism is a contactless coupling mechanism, where a fewer number of metal layers may be utilized, and thereby resulting in reduction of manufacturing cost.

The metamaterial board 200 illustrated may be realized in standard Printed Circuit Board (PCB) technology utilizing two metal layers. The two metal layers comprise a conductive backing layer 202 and a metamaterial layer 204. Also, a dielectric layer 206 is disposed between the conductive backing layer 202, and the metamaterial layer 204. In the metamaterial board 200 fabrication, the conductive backing layer 202 is placed at the bottom of the structure of the metamaterial board 200. The metamaterial layer 204 may be deposited above the conductive backing layer 202, and then may be etched to create an array of unit cells 204*a*. In an embodiment, a distance between the conductive backing layer 202 and the metamaterial layer 204 is such that there is no short-circuit between the conductive backing layer 202 and the metamaterial layer 204 in order to make the metamaterial unit cells 204*a* radiate. Below the metamaterial layer 204 and above the conductive backing layer 202 may be deposited a layer of dielectric 206 or insulating material, often a silicon dioxide.

The metamaterial layer 204 comprises the array of unit cells 204*a*. In the illustrative figure, the metamaterial layer 204 of the metamaterial board 100 comprises sixteen radiative metamaterial unit cells 204*a* in a four-by-four (4×4) arrangement. Each of the metamaterial unit cell 204*a* may include a surface. In one embodiment, the surface may be a substantially flat surface. In another embodiment, the surface may not be a flat surface or a substantially flat surface. The substantially flat surface of each of the array of unit cells 204*a* may be a square surface containing a square metal patch 204*b* with an aperture 204*c* inscribed within it. The square metal patch 204*b* does not completely fill the unit cell surface, but is slightly smaller than the unit cell. The substantially flat surface of each of the array of unit cells 204*a* may be a square metal patch 204*b* with an aperture 204*c* inscribed therein. The aperture 204*c* is defined such that a periphery of the aperture 204*c* is within a periphery of the square metal patch 204*b* by a spacing distance. In one example, the aperture 204*c* may be a circular aperture. An element 204*d* may be disposed within the aperture 204*c* to form a circular slot. In the illustrated embodiment, since the aperture 204*c* is circular in shape, the element 204*d* is a circular metal disk that is disposed within aperture 204*c* to form the circular slot. It will be appreciated by a person having ordinary skill in the art that the shape of the aperture 204*c* is not limited to circular shape, and the aperture 204*c* may be of any other suitable shape without moving out from the scope of the disclosed embodiments. Also, the array composed of metamaterial unit cells 204*a* contains square metal patches 204*b* that do not touch each other, but are separated by narrow straight slots, since the unit cell surface is slightly larger than that of the square metal patches 204*b* inscribed therein. In the illustrative figure, each of the unit cells 204*a* is attached to the neighboring unit cell 204*a*, but the inscribed square metal patches 204*b* corresponding to these unit cells are separated by small-sized slots. Further, there is a thin slot separating the circular element 204*d* from the periphery of the square metal patch 204*b*. In an embodiment, one subset of the array of the metamaterial unit cells 204*a* may be of one shape and size, and another subset of the array of the metamaterial unit cells 204*a* may be of another shape and size.

The dielectric layer 206 is masked and etched to open narrow profile openings known as vias 208. Each of the vias 208 respectively extends as an opening through the dielectric layer 206 to a portion of the uppermost layer. The vias 208 may be present to provide electrical paths between different metal layers of the metamaterial board 200. In the illustrated figure, the vias 208 extend from the metamaterial layer 204 to input RF ports 210. The input RF ports 210 may be located on or behind the conductive backing layer 202. The geometries of the vias 208 and the contact structures that now fill the vias 208 are usually circular although the vias 208 may also form other shapes such as a trench shape. The vias 208 have been positioned so that the metallic structures that fill the vias 208 provide contacts between two separated metal layers of the metamaterial board 200. In order to form the metamaterial board 200 with the vias 208 as described above, once a pattern of the vias 208 to traverse the layers is determined, these particular vias 208 may be machine drilled, punched, or etched through the layers. Alternative techniques for providing electrical paths between the layers may be utilized.

In an embodiment, excitation components of the co-planar coupling mechanism may be placed on the plane of the metamaterial unit cells 204*a* of the metamaterial board 200 to excite the structure of the metamaterial board 200. In the present embodiment, the excitation of the metamaterial unit cells 204*a* of the metamaterial layer 204 is achieved without direct contact by a capacitive structure which couples RF power from the input RF port 210 to the metamaterial layer 204. The RF port 210 is placed on the conductive backing layer 202, where the RF port 210 feeding pads are placed within a small aperture in the conductive backing layer 202. The co-planar coupling excitation mechanism utilize two metal layers of the metamaterial board 200.

In an embodiment, the two vias 208 connect to the RF port 210, and therefore have a positive polarity and a negative polarity. One of the vias 208 at a negative potential is configured to excite half of the metamaterial unit cells 204*a* and the other via of two vias 208 at a positive potential is configured to excite the remaining half of the metamaterial unit cells 204*a*.

In illustrative embodiment, the metamaterial unit cell 204*a* is a square surface surrounding the square metal 204*b* comprising the aperture 204*c*, and the metallic element 204*d* disposed within the aperture 204*c*. The size of the aperture 204*c* is inversely proportional to a frequency of operation. If the size of the aperture 204*c* is reduced, the size of the metallic element 204*d* disposed within the aperture 204*c* is also reduced, and then the frequency of the operation moves up. If the size of the aperture 204*c* is increased, the size of the metallic element 204*d* disposed within the aperture 204*c* also becomes larger, and the frequency at which the metamaterial unit cell 204*a* operates goes down. The aperture 204*c* may be of circular shape. In an alternate embodiment, the aperture 204*c* may be an elliptical shape. Alternate shapes may be utilized as well.

The radiating structure of the metamaterial board 200 is linearly polarized, and has a transmit mode and a receive mode. In the transmit mode/configuration, the radiating structure of the metamaterial board 200 emits radiation, where the electric field has a specific direction along a single line. In the receive mode/configuration, the radiating structure of the metamaterial board 200 receives the radiation. In an embodiment, the radiation and impedance matching properties of the metamaterial board 200 having the coplanar coupling mechanism is identical to the structure of the metamaterial board 100 of FIG. 1A.

Figure 3A:
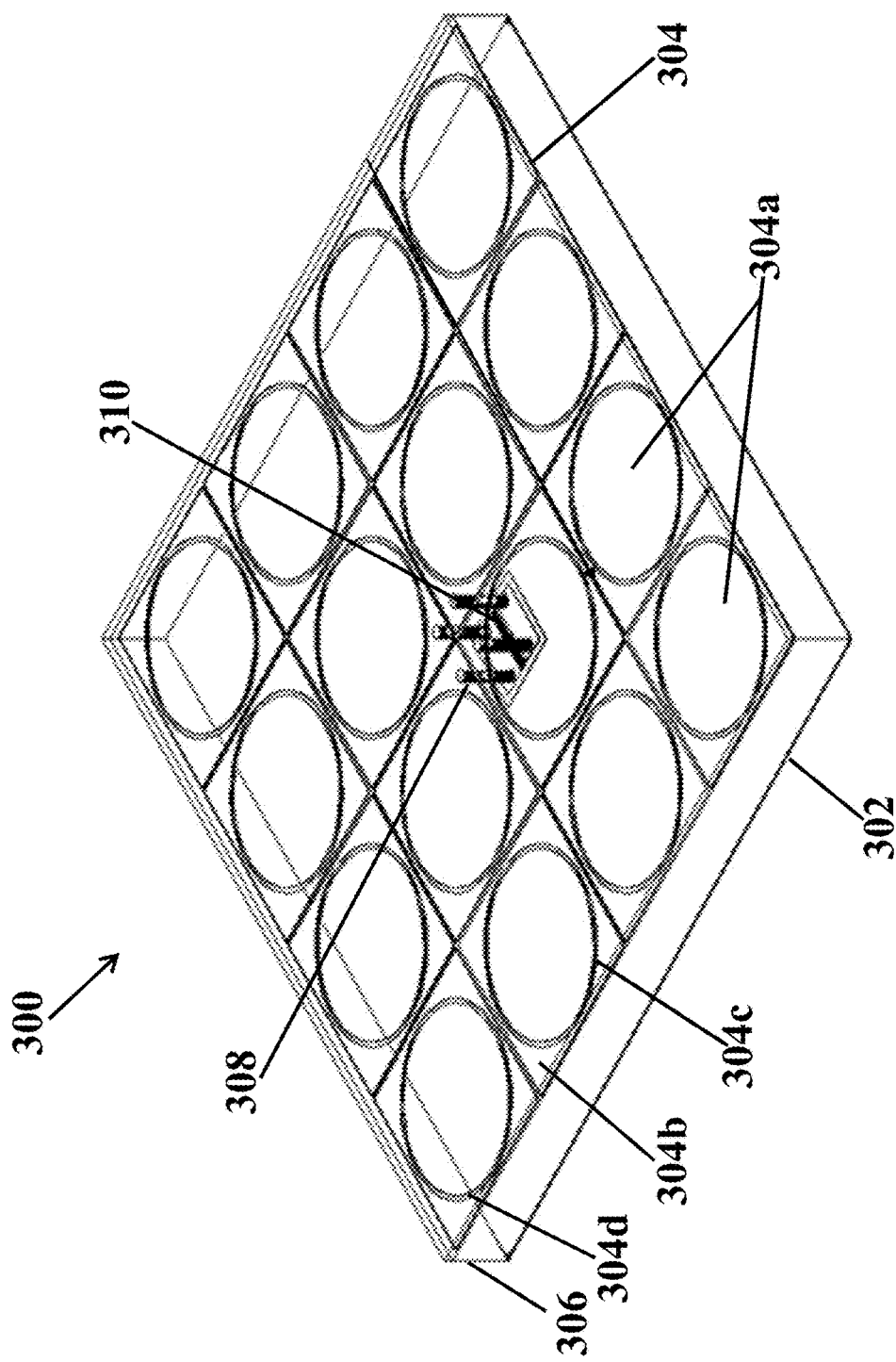
FIG. 3A illustrates an isometric view of a structure of a metamaterial board having a direct feeding excitation mechanism, according to an exemplary embodiment.

FIG. 3A illustrates an isometric view of a structure of a metamaterial board 300 having a direct feeding excitation mechanism, according to an exemplary embodiment. In this embodiment, the excitation mechanism used is the direct feeding mechanism through conductive vias. The direct feeding excitation mechanism may utilize two metal layers, thereby resulting in reduction of manufacturing cost. In the direct feeding excitation mechanism, the excitation of the metamaterial unit cells of the metamaterial board 300 does not happen with coupling either capacitively or coplanar, but happens when the vias directly connect to metamaterial unit cells.

The metamaterial board 300 illustrated here may be realized in standard Printed Circuit Board (PCB) technology utilizing two metal layers. The two metal layers may include a conductive backing layer 302, and a metamaterial layer 304. Also, a dielectric layer 306 may be disposed between the conductive backing layer 302, and the metamaterial layer 304. In the metamaterial board 300 fabrication, the conductive backing layer 302 is placed at the bottom of the structure of the metamaterial board 300. The metamaterial layer 304 is deposited above the conductive backing layer 302, and then may be etched to create an array of unit cells 304*a*. In an embodiment, a distance between the conductive backing layer 302 and the metamaterial layer 304 is such that there is no short-circuit between the conductive backing layer 202 and the metamaterial layer 204 in order to make the metamaterial unit cells 304*a* radiate. Below the metamaterial layer 304 and above the conductive backing layer 302 may be deposited a layer of dielectric 306 or insulating material, often a silicon dioxide.

The metamaterial layer 304 comprises the array of unit cells 304*a*. In the illustrative figure, the metamaterial layer 304 of the metamaterial board 300 comprises sixteen radiative metamaterial unit cells 304*a* in a four-by-four (4×4) arrangement. In the illustrative figure, each of the unit cells 304*a* not attached to the other, and there is a small sized slot separating these unit cells 304*a* from each other. Each of the metamaterial unit cell 304*a* may include a surface. In one embodiment, the surface may be a substantially flat surface. In another embodiment, the surface may not be a flat surface or a substantially flat surface. The substantially flat surface of each of the array of unit cells 304*a* may be a square surface containing a square metal patch 304*b* with an aperture 304*c* inscribed within it. The square metal patch 304*b* does not completely fill the unit cell surface, but is slightly smaller than the unit cell. The substantially flat surface of each of the array of unit cells 304*a* may be a square metal patch 304*b* with an aperture 304*c* inscribed within it. The aperture 304*c* is defined such that a periphery of the aperture 304*c* is within a periphery of the square metal patch 304*b* by a spacing distance. In one example, the aperture 304*c* may be a circular aperture. An element 304*d* may be disposed within the aperture 304*c* to form a circular slot. In the illustrated embodiment, since the aperture 304*c* is circular in shape, the element 304*d* is a circular metal disk that is disposed within the aperture 304*c* to form the circular slot. It will be appreciated by a person having ordinary skill in the art that the shape of the aperture 304*c* is not limited to circular shape, and the aperture 304*c* may be of any other suitable shape without moving out from the scope of the disclosed embodiments. Also, the array composed of metamaterial unit cells 304*a* contains square metal patches 304*b* that do not touch each other, but are separated by narrow straight slots, since the unit cell surface is slightly larger than that of the metal patch inscribed in it. In the illustrative figure, each of the unit cells 304*a* is attached to the neighboring unit cell 304*a*, but the inscribed square metal patches 304*b* corresponding to these unit cells 304*a* are separated by small-sized slots. Further, there is a thin slot separating the circular element 304*d* from the periphery of the square metal patch 304*b*. In an embodiment, one subset of the array of the metamaterial unit cells 304*a* may be of one shape and size, and another subset of the array of the metamaterial unit cells 304*a* may be of another shape and size.

The dielectric layer 306 may be masked and etched to open narrow profile openings known as vias 308. Each of the vias 208 respectively extend as an opening through the dielectric layer 306 to a portion of the uppermost layer. The vias 308 may be present to provide electrical paths between different metal layers of the metamaterial board 300. In the illustrated figure, the vias 308 extend from the metamaterial layer 304 to input RF ports 310. The input RF ports 310 may be located on or behind the conductive backing layer 302. The geometries of the vias 308 and the contact structures which now fill the vias 308 are usually circular although the vias 308 may also form other shapes such as a trench shape. The vias 308 have been positioned so that the metallic structures which fill the vias 308 provide contacts between two separated metal layers of the metamaterial board 300.

In an embodiment, excitation components of the direct feeding mechanism may be placed on the plane of the metamaterial unit cells 304*a* of the metamaterial board 300 to excite the metamaterial board 300. In the present embodiment, the excitation of the metamaterial unit cells 304*a* of the metamaterial layer 304 is achieved by the vias 308. In an embodiment, the vias 308 may connect to the RF port 310 and therefore have a positive polarity and a negative polarity. One of the vias 308*a* at a negative potential is configured to excite half of the metamaterial unit cells 304*a* and the other via of two vias 308*b* at a positive potential is configured to excite remaining half of the metamaterial unit cells 304*a*.

In illustrative embodiment, the metamaterial unit cell 304*a* may be a square surface surrounding the square metal 304*b* comprising the aperture 304*c*, and the metallic element 304*d* may be disposed within the aperture 304*c*. The size of the aperture 304*c* is inversely proportional to a frequency of operation. If the size of the aperture 304*c* is reduced, the size of the metallic element 304*c* disposed within the aperture 304*c* is also reduced, and then the frequency of the operation moves up. If the size of the aperture 304*c* is increased, the size of the metallic element 304*c* disposed within the aperture 304*c* is also becomes larger, and then the frequency at which the metamaterial unit cell 304*a* operates goes down. The aperture 304*c* may be of circular shape. In an alternate embodiment, the aperture 304*c* may be an eclipse shape. Alternate shapes may be utilized.

The radiating structure of the metamaterial board 300 is linearly polarized, and has a transmit mode and a receive mode. In the transmit mode/configuration, the radiating structure of the metamaterial board 300 emit radiation, where the electric field has a specific direction along a single line. In the receive mode/configuration, the radiating structure of the metamaterial board 200 receives the radiations.

Figure 3B:
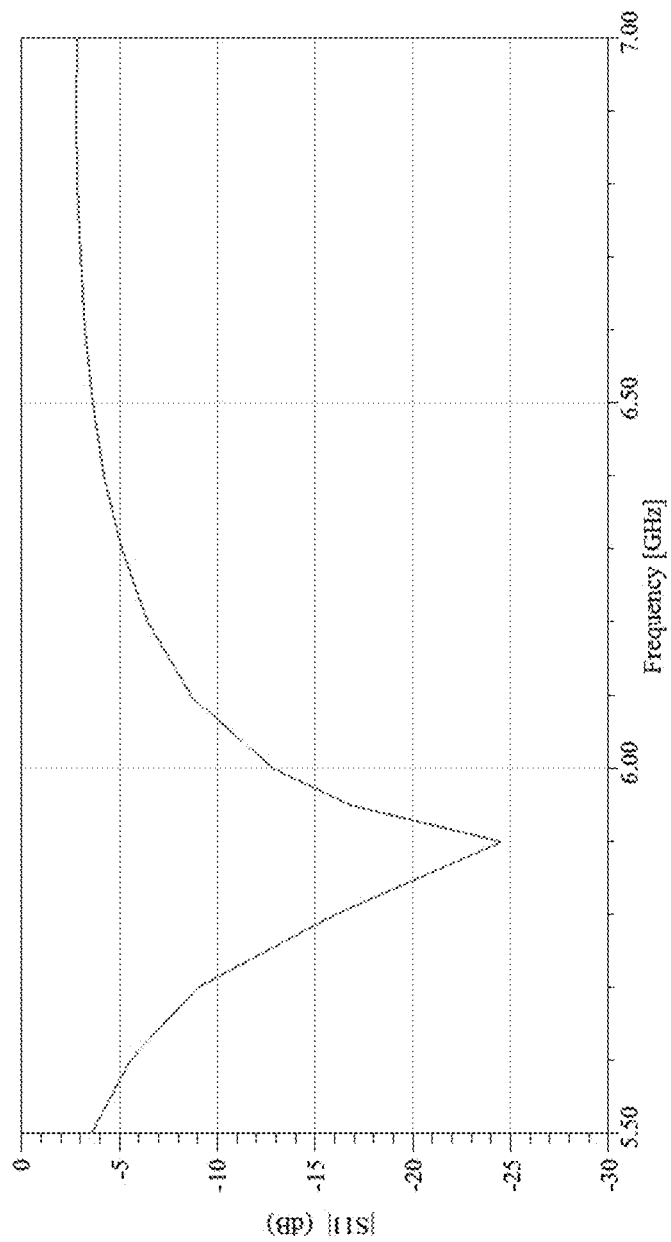
FIG. 3B illustrates a graph depicting a return loss of a metamaterial board having a direct feeding excitation mechanism of FIG. 3A, according to an exemplary embodiment.

FIG. 3B illustrates a graph depicting a return loss of a metamaterial board 300 having a direct feeding excitation mechanism of FIG. 3A, according to an exemplary embodiment. The return loss (reflected power) of the metamaterial board 300 having the direct feeding excitation mechanism is measured in dB. The metamaterial board 300 having the direct feeding excitation mechanism resonates at a center frequency of 5.9 GHz. The impedance matching here to a 50 Ohm RF port 310 is at −25 dB. The impedance matching represents matching of the metamaterial board 300 having the direct feeding excitation mechanism to a standard RF port 310 which is typically 50 ohm. The impedance matching bandwidth at the −10 dB level is 350 MHz, or 6% with respect to a center frequency of the metamaterial board 300. The impedance matching defines the operation frequency band of the metamaterial board 300 having the direct feeding excitation mechanism.

Figure 3C:
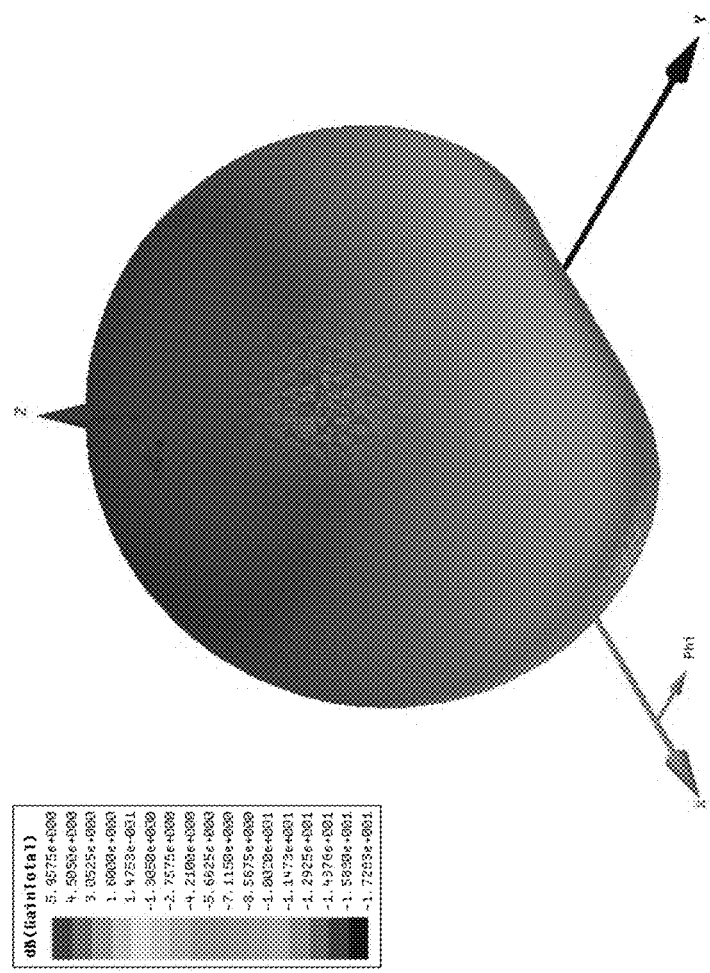
FIG. 3C illustrates an isometric view of a radiation gain pattern of a metamaterial board having a direct feeding excitation mechanism of FIG. 3A, according to an exemplary embodiment.

FIG. 3C illustrates an isometric view of a radiation gain pattern of a metamaterial board 300 having a direct feeding excitation mechanism of FIG. 3A, according to an exemplary embodiment. As shown, the metamaterial board 300 having the direct feeding excitation mechanism has a single directive electromagnetic beam of energy that is radiating upward/forward, that is, along the z-axis. The single directive electromagnetic beam is generated by excitation of entire sixteen metamaterial unit cells 304a of the metamaterial board 300.

Figure 3D:
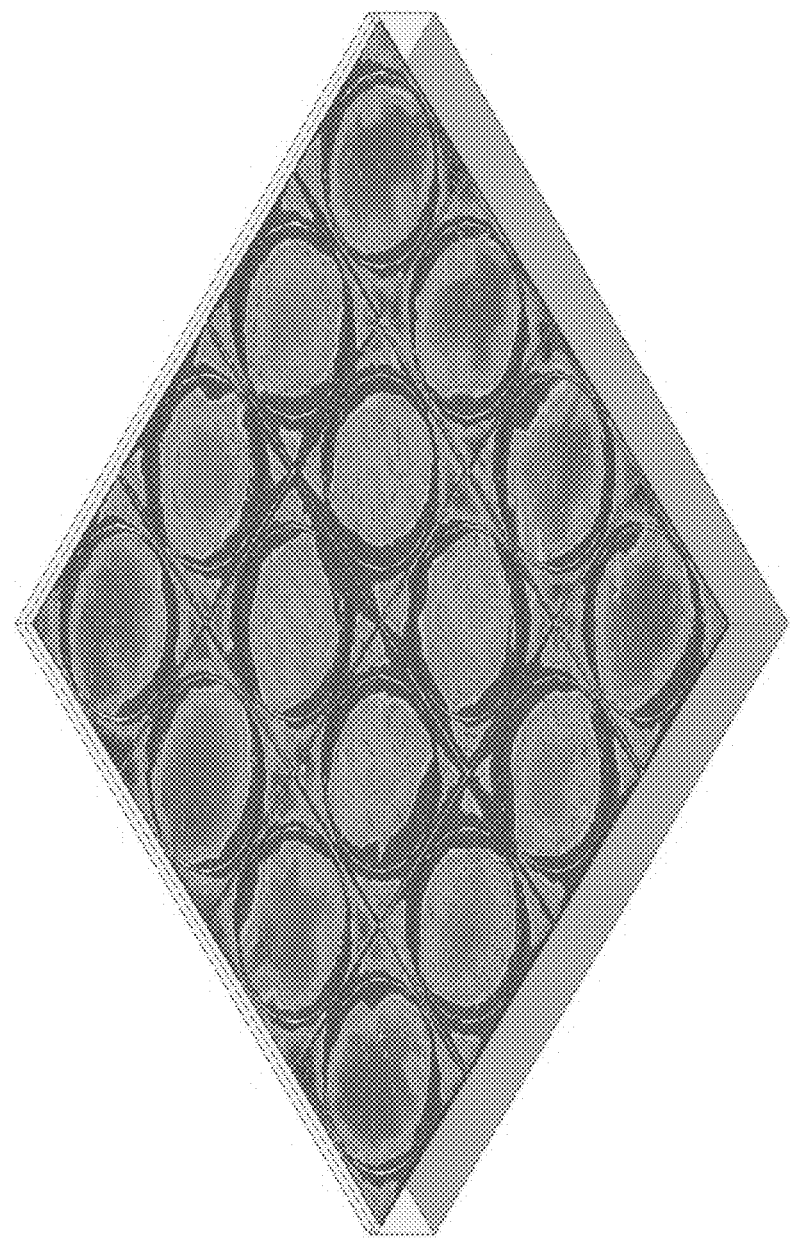
FIG. 3D illustrates a magnitude of electric current surface density distribution on metamaterial cells layer of a metamaterial board having a direct feeding excitation mechanism of FIG. 3A at operational frequencies, according to an exemplary embodiment.

FIG. 3D illustrates a magnitude of electric current surface density distribution on metamaterial cells layer 302 of a metamaterial board 300 having a direct feeding excitation mechanism of FIG. 3A at operation frequencies, according to an exemplary embodiment. The magnitude of the electric current surface density distributed on the radiative metamaterial unit cells 304a of the metamaterial board 300 having the direct feeding excitation mechanism, at the operating frequency band, where the metamaterial board radiates is shown. In one embodiment, a plurality of metamaterial unit cells 304a of the metamaterial board 300 are excited from the direct feeding excitation mechanism and subsequently strong electric currents develop both on square patch edges and on circular slot edges of each of the metamaterial unit cells 304a of the metamaterial board 300. This results in the plurality of metamaterial unit cells 304a of the metamaterial board 300 contributing to the electromagnetic radiation simultaneously, thereby leading to a high radiative gain of the metamaterial board 300. In another embodiment, all the metamaterial unit cells 304a of the metamaterial board 300 are excited from the direct feeding excitation mechanism due to strong electric currents that develop both on the square patch edges and on the circular slot edges of each of the metamaterial unit cells 304a of the metamaterial board 300. In this embodiment, all the metamaterial unit cells 304a of the metamaterial board 300 contributing to the electromagnetic radiation simultaneously, thereby leading to a high radiative gain of the metamaterial board 300.

In an embodiment, although the excitation of the metamaterial unit cells 304a of the metamaterial board 300 is localized at the center of the metamaterial board 300 using the direct feed coupling mechanism, however as shown in the figure, the electric current spreads on all of the metamaterial unit cells 304a of the metamaterial board 300 in order for radiation to occur. In an alternate embodiment, the excitation of the metamaterial unit cells 304a of the metamaterial board 300 may be localized at any location of the metamaterial board 300 such that the electric current spreads on the plurality of the metamaterial unit cells 304a of the metamaterial board 300 in order for radiation to occur.

In an embodiment, in order for radiation to occur, the metamaterial board 300 using the direct feed coupling mechanism may utilize more than one metamaterial unit cell 304a that causes excitation for radiation to happen. In such a case, the multiple metamaterial unit cells 304a of the metamaterial board 300 has properties to work as a standard antenna. In an alternate embodiment, in order for radiation to occur, the metamaterial board 300 using the direct feed coupling mechanism may have a single metamaterial unit cell 304a that may be excited for radiation to happen. In such a case, the single metamaterial unit cell 304a has properties to work as a standard antenna.

Figure 3E:
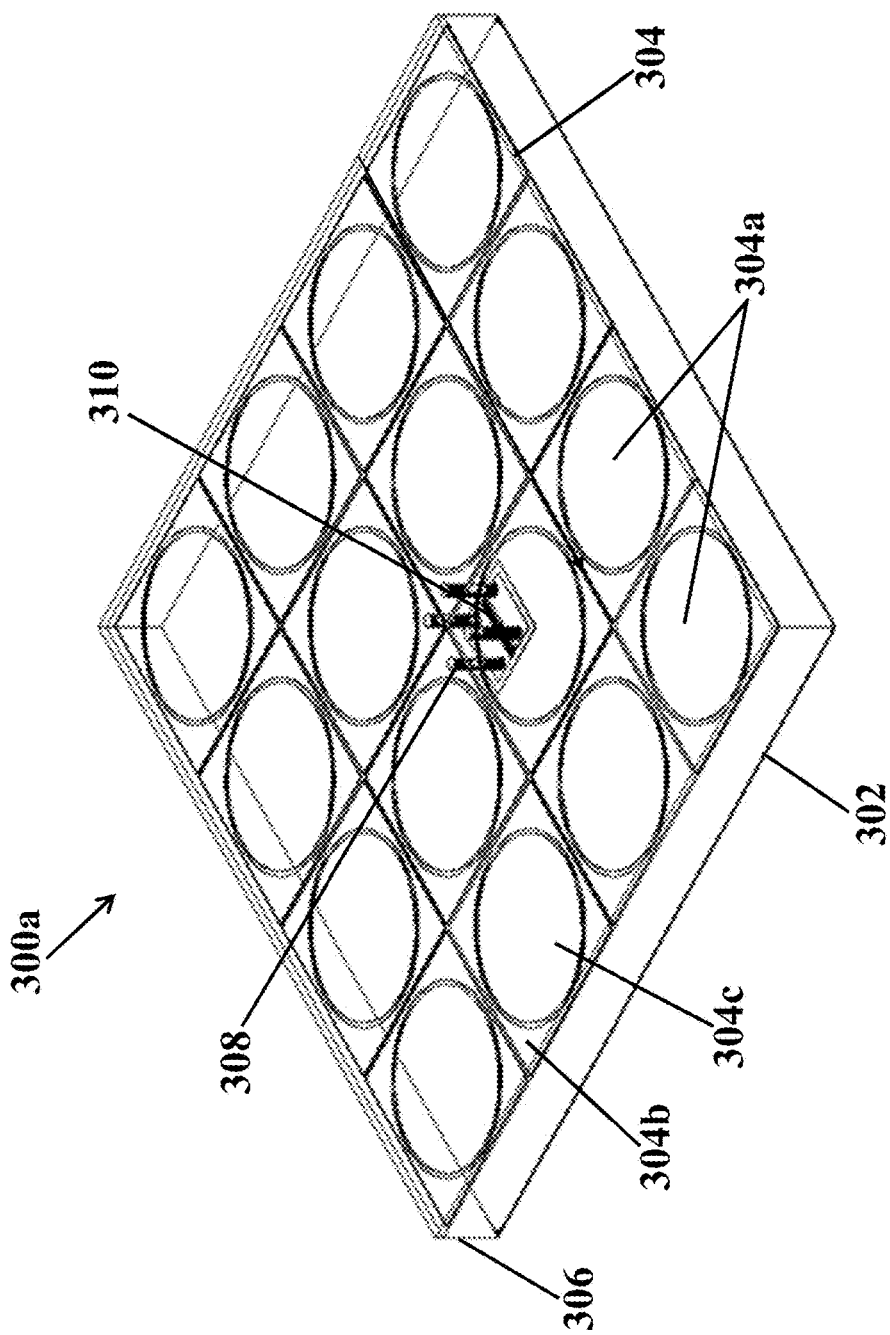
FIG. 3E illustrates an isometric view of a structure of a metamaterial board having a direct feeding excitation mechanism, according to an exemplary embodiment.

FIG. 3E illustrates an isometric view of a structure of a metamaterial board 300a having a direct feeding excitation mechanism, according to an exemplary embodiment. The structure of the metamaterial board 300a of FIG. 3E is similar to the structure of the metamaterial board 300 of FIG. 3A other than the dimensions and sizes of the metamaterial unit cells 304a of the metamaterial board 300a. The difference in the dimensions and sizes of the components such as metamaterial unit cells 304a of the metamaterial board 300a in comparison to the dimensions and sizes of the components such as metamaterial unit cells of the metamaterial board 300 aids to achieve the scaling of the operation frequency. In this embodiment, circular slots on each of the metamaterial unit cells 304a of the metamaterial board 300a are narrower than the circular slots on each of the metamaterial unit cells of the metamaterial board 300 of FIG. 3A. Also, spacing distance between the square patches of the metamaterial unit cells 304a of the metamaterial board 300a is narrower than the spacing distance between the square patches of metamaterial unit cells of the metamaterial board 300 of FIG. 3A. In the illustrated example, the circular slots on each of the metamaterial unit cells 304a of the metamaterial board 300a are 0.1 mm wide in comparison to the circular slots on each of the metamaterial unit cells of the metamaterial board 300 of FIG. 3A which were 0.15 mm wide. In the illustrated example, the total size of the metamaterial board in the embodiments described in FIG. 3A and FIG. 3E is 20 mm×20 mm, however it is to be appreciated by a person having ordinary skill in the art that in other embodiments the size may vary without moving out from the scope of the disclosed embodiments.

Figure 3F:
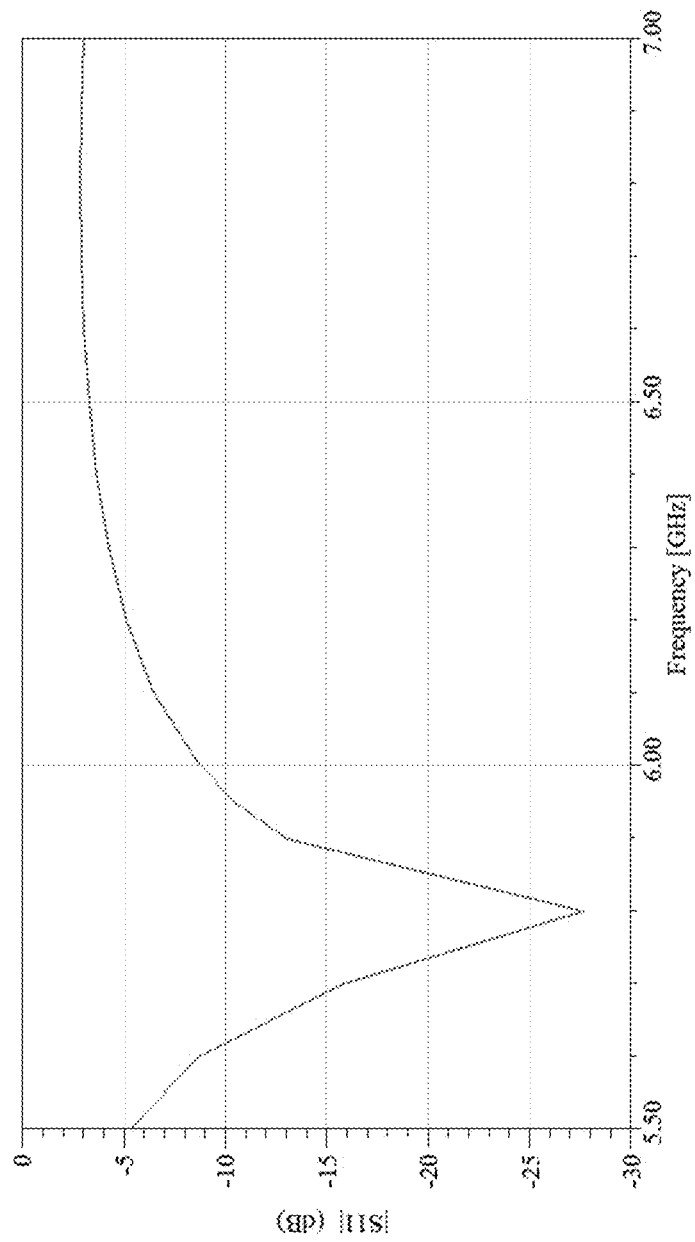
FIG. 3F illustrates a graph depicting a return loss of a metamaterial board having a direct feeding excitation mechanism of FIG. 3E, according to an exemplary embodiment.

FIG. 3F illustrates a graph depicting a return loss of a metamaterial board 300a having a direct feeding excitation mechanism of FIG. 3E, according to an exemplary embodiment. The return loss (reflected power) of the metamaterial board 300a having the direct feeding excitation mechanism is measured in dB. The metamaterial board 300a having the direct feeding excitation mechanism resonates at a center frequency of 5.8 GHz. The center frequency is reduced by 150-100 MHz relative to the embodiments discussed in FIG. 3A without increase in the size of the overall structure of the metamaterial board 300a. The impedance matching to a 50-Ohm RF port is at −28 dB. The impedance matching represents matching of the metamaterial board 300a having the direct feeding excitation mechanism to a standard RF port which is typically 50 ohm. The impedance matching bandwidth at the −10 dB level is 350 MHz, or 6% with respect to a center frequency of the metamaterial board 300a.

Figure 4:
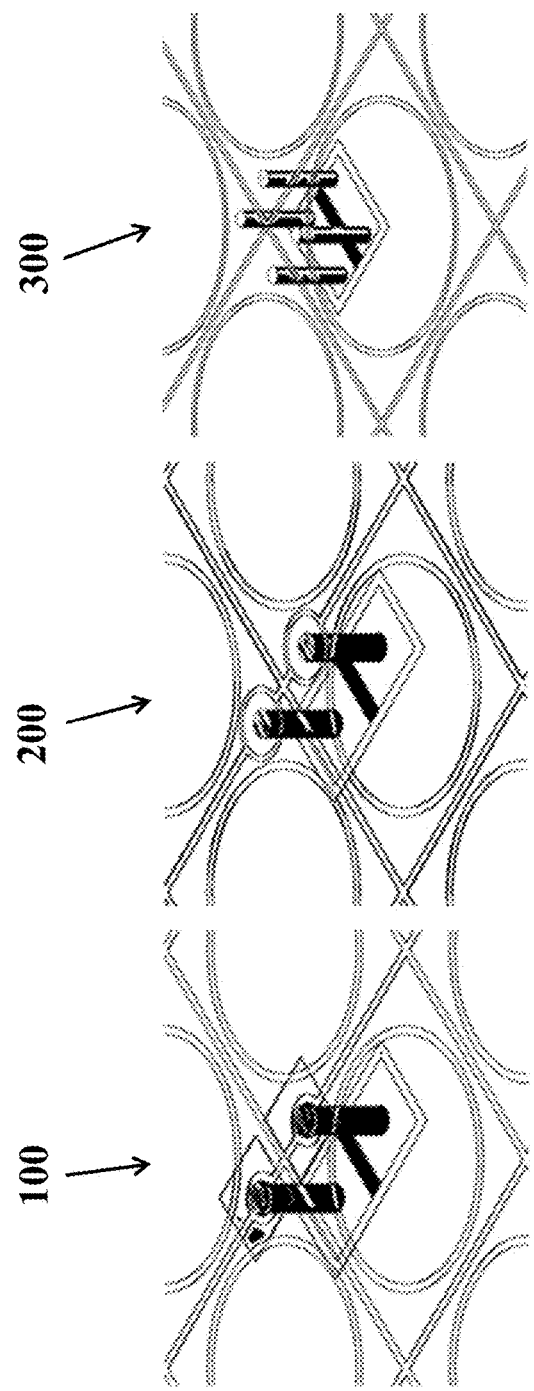
FIG. 4 illustrates an enlarged sectional view of a structure of a metamaterial board having a contactless capacitive coupling mechanism, a co-planar coupling mechanism, and a direct feeding excitation mechanism, according to an exemplary embodiment.

FIG. 4 illustrates an enlarged sectional view of a structure of a metamaterial board having a contactless capacitive coupling, a co-planar coupling mechanism, and a direct feeding excitation mechanism, according to an exemplary embodiment. The metamaterial board 100 having the contactless capacitive coupling mechanism, the metamaterial board 200 having the co-planar coupling mechanism, and the metamaterial board 300 having the direct feeding excitation mechanism have the same or substantially the same physical characteristics, operation bandwidth and performance. In another embodiment, other excitation mechanisms to excite the metamaterial board for radiation to happen may be used. In yet another embodiment, hybrid combinations of the metamaterial board 100 having the contactless capacitive coupling mechanism, the metamaterial board 200 having the co-planar coupling mechanism, and the metamaterial board 300 having the direct feeding excitation mechanism may be employed.

In an embodiment, the metamaterial board 100 having the contactless capacitive coupling mechanism uses three metal layers. The metamaterial board 200 having the co-planar coupling mechanism, and the metamaterial board 300 having the direct feeding excitation mechanism uses two metal layers. The metamaterial board 100 having the contactless capacitive coupling mechanism uses an extra metallic layer in comparison to the metamaterial board 200 having the co-planar coupling mechanism, and the metamaterial board 300 having the direct feeding excitation mechanism. Each layer of metal increases the cost of manufacturing and therefore the manufacturing cost of the metamaterial board 200 having the co-planar coupling mechanism, and the metamaterial board 300 having the direct feeding excitation mechanism is less than the metamaterial board 100 having the contactless capacitive coupling mechanism. As the metamaterial board 300 having the direct feeding excitation mechanism uses two metal layers, the control of manufacturing process is more robust in the metamaterial board 300 having the direct feeding excitation mechanism by directly having the vias positioned on the actual metamaterial unit cells without having any circular patches with a specific slot exciting the central metamaterial unit cells of the metamaterial board 300.

In an embodiment, the size of the metamaterial unit cell in the metamaterial board 100 having the contactless capacitive coupling mechanism, the metamaterial board 200 having the co-planar coupling mechanism, and the metamaterial board 300 having the direct feeding excitation mechanism is selected based on a desired operating frequency. The size of the metamaterial unit cell along with its adjacent metamaterial unit cells determines the frequency of operation of the metamaterial board 100 having the contactless capacitive coupling mechanism, the metamaterial board 200 having the co-planar coupling mechanism, and the metamaterial board 300 having the direct feeding excitation mechanism. The frequency of the unit cell is configured to operate in a frequency band ranging from 900 MHz to 100 GHz. In an embodiment, the shape of the metamaterial unit cell in the metamaterial board 100 having the contactless capacitive coupling mechanism, the metamaterial board 200 having the co-planar coupling mechanism, and the metamaterial board 300 having the direct feeding excitation mechanism such as thin slots are important for frequency tuning. In an embodiment, the diameter of each of the metamaterial unit cell of the metamaterial board 100 having the contactless capacitive coupling mechanism, the metamaterial board 200 having the co-planar coupling mechanism, and the metamaterial board 300 having the direct feeding excitation mechanism is about one-tenth of the wavelength of the frequency of operation.

Figure 5A:
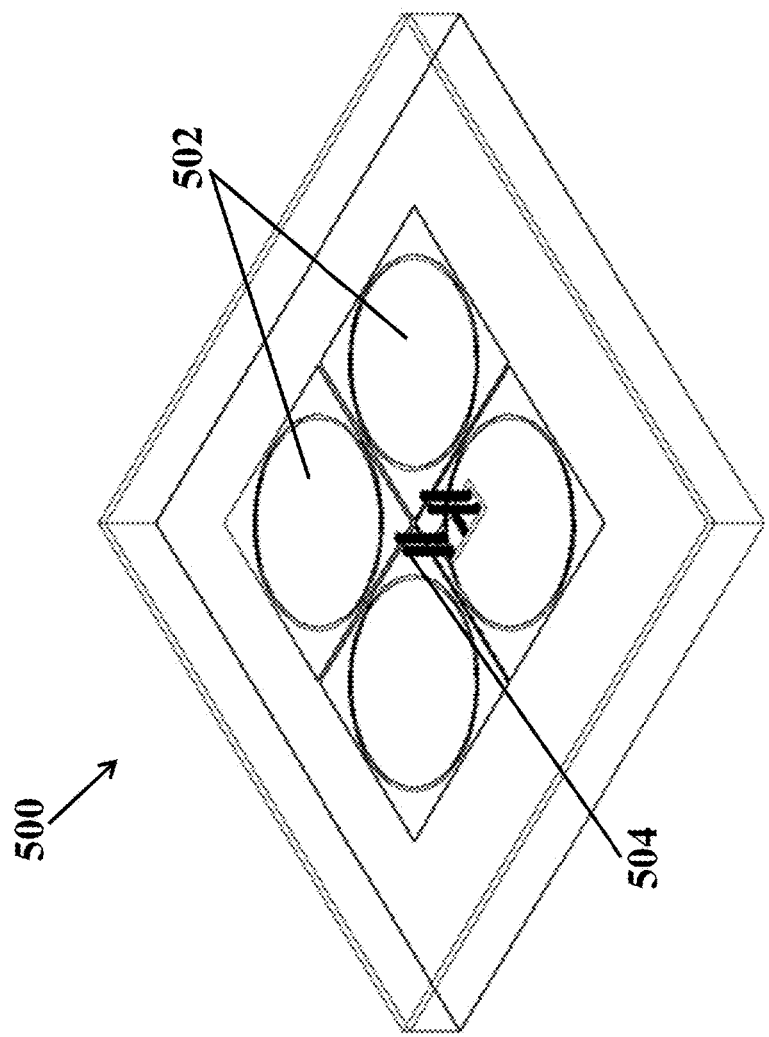
FIG. 5A illustrates an isometric view of a structure of a metamaterial board having a direct feeding excitation mechanism, according to an exemplary embodiment.

FIG. 5A illustrates an isometric view of a structure of a metamaterial board 500 having a direct feeding excitation mechanism, according to an exemplary embodiment. As previously described, number of metamaterial unit cells affects the performance of metamaterial board. In the illustrative embodiment, the size of the metamaterial board 500 is identical or substantially identical to the size of the metamaterial board 300 illustrated in FIG. 3A, but the metamaterial board 500 of the illustrative embodiment comprises four metamaterial unit cells 502 in comparison to the sixteen unit cells 304a of the metamaterial board 300 illustrated in FIG. 3A. In this embodiment, the excitation mechanism used is direct feeding excitation mechanism through conductive vias. The direct feeding excitation mechanism utilizes two metal layers, and thereby resulting in reduction of manufacturing cost. In the direct feeding excitation mechanism, the excitation of the metamaterial unit cells 502 of the metamaterial board 500 does not happen with coupling either capacitively or coplanar, but happens when vias 504 directly connect to metamaterial unit cells 502. The direct feeding excitation mechanism is explained in detail in FIG. 3A.

Figure 5B:
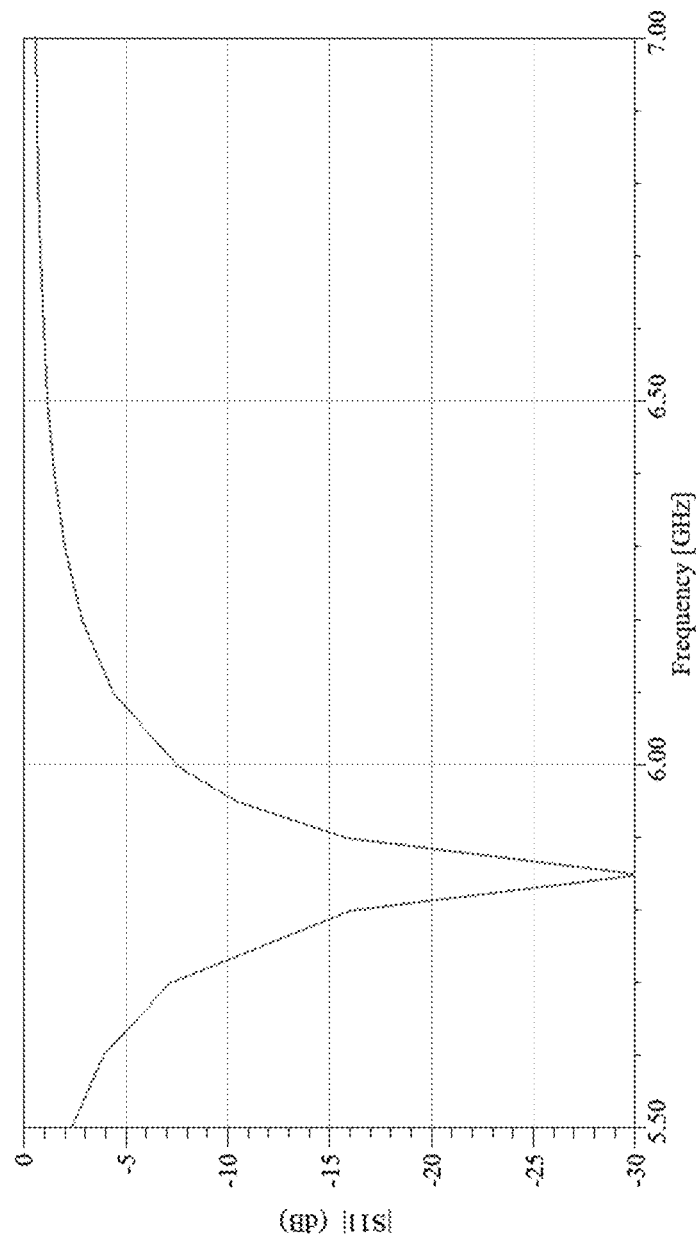
FIG. 5B illustrates a graph depicting a return loss of a metamaterial board having a direct feeding excitation mechanism of FIG. 5A, according to an exemplary embodiment.

FIG. 5B illustrates a graph depicting a return loss of a metamaterial board 500 having a direct feeding excitation mechanism FIG. 5A, according to an exemplary embodiment. The return loss (reflected power) of the metamaterial board 500 having the direct feeding excitation mechanism is measured in dB. The metamaterial board 500 having the direct feeding excitation mechanism resonates at a center frequency of 5.8 GHz. This illustrates that the resonant frequency of operation is determined by design of the metamaterial unit cells 502 and is not dependent on the number of the metamaterial unit cells 502. The impedance matching to a 50-Ohm RF port is at or below −30 dB, which is smaller than the embodiments discussed earlier having sixteen metamaterial unit cells. The impedance matching represents matching of the metamaterial board 500 to a standard RF port, which is typically 50 ohm. The impedance matching bandwidth at the −10 dB level is 240 MHz, or 4% with respect to a center frequency of the metamaterial board 500. The impedance matching defines the operation frequency band of the structure of the metamaterial board 500.

Figure 5C:
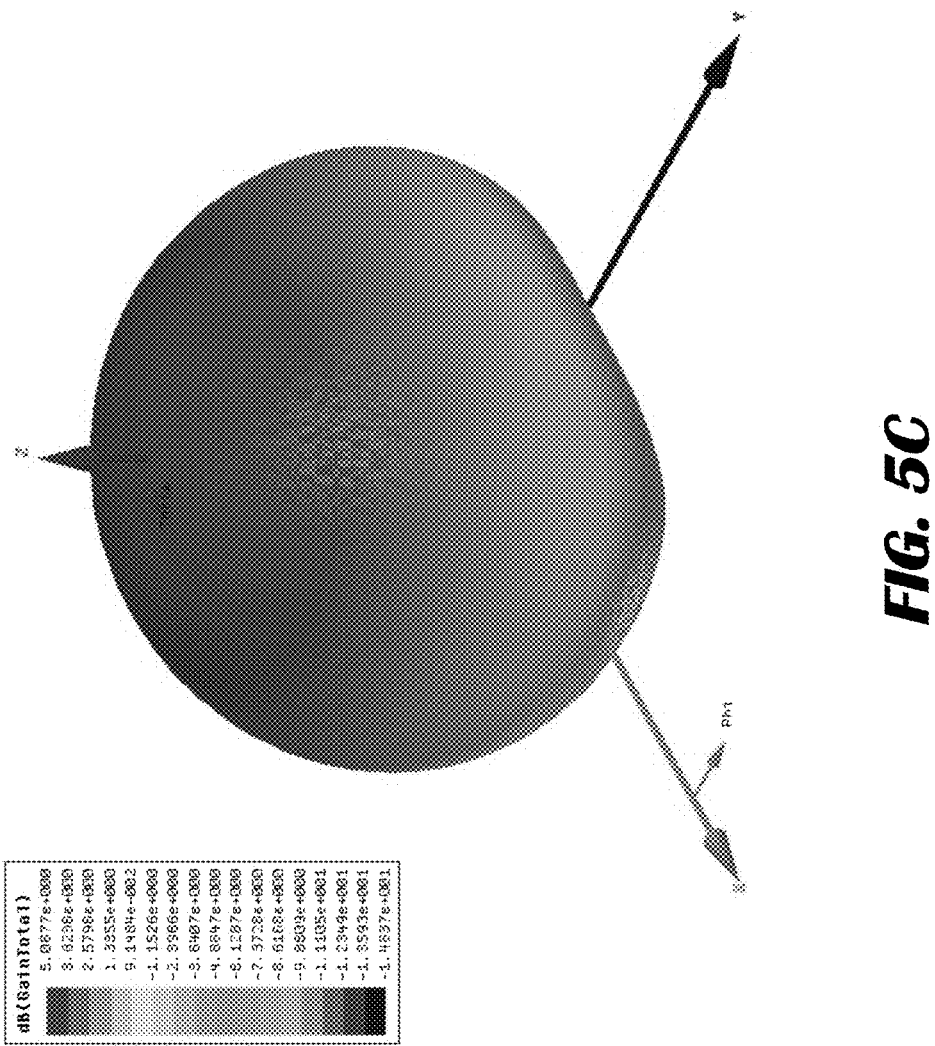
FIG. 5C illustrates an isometric view of a radiation gain pattern of a metamaterial board having a direct feeding excitation mechanism of FIG. 5A, according to an exemplary embodiment.

FIG. 5C illustrates a 3-dimensional isometric view of a radiation gain pattern of a metamaterial board 500 having a direct feeding excitation mechanism of FIG. 5A, according to an exemplary embodiment. As shown, the metamaterial board 500 having the direct feeding excitation mechanism has a single directive electromagnetic beam of energy that is radiating upward/forward. The single directive electromagnetic beam is generated by excitation of entire four metamaterial unit cells 502 of the metamaterial board 500. In the illustrative embodiment, the maximum gain is 5 dBi, which is 1 dB lower than the earlier embodiments discussed comprising sixteen metamaterial unit cells. Since the size of the conductive backing layer is same in earlier and the present embodiment, the directive radiation is caused by the collective excitation of a plurality of metamaterial unit cells 502 in the present embodiment as well as earlier embodiments.

Figure 5D:
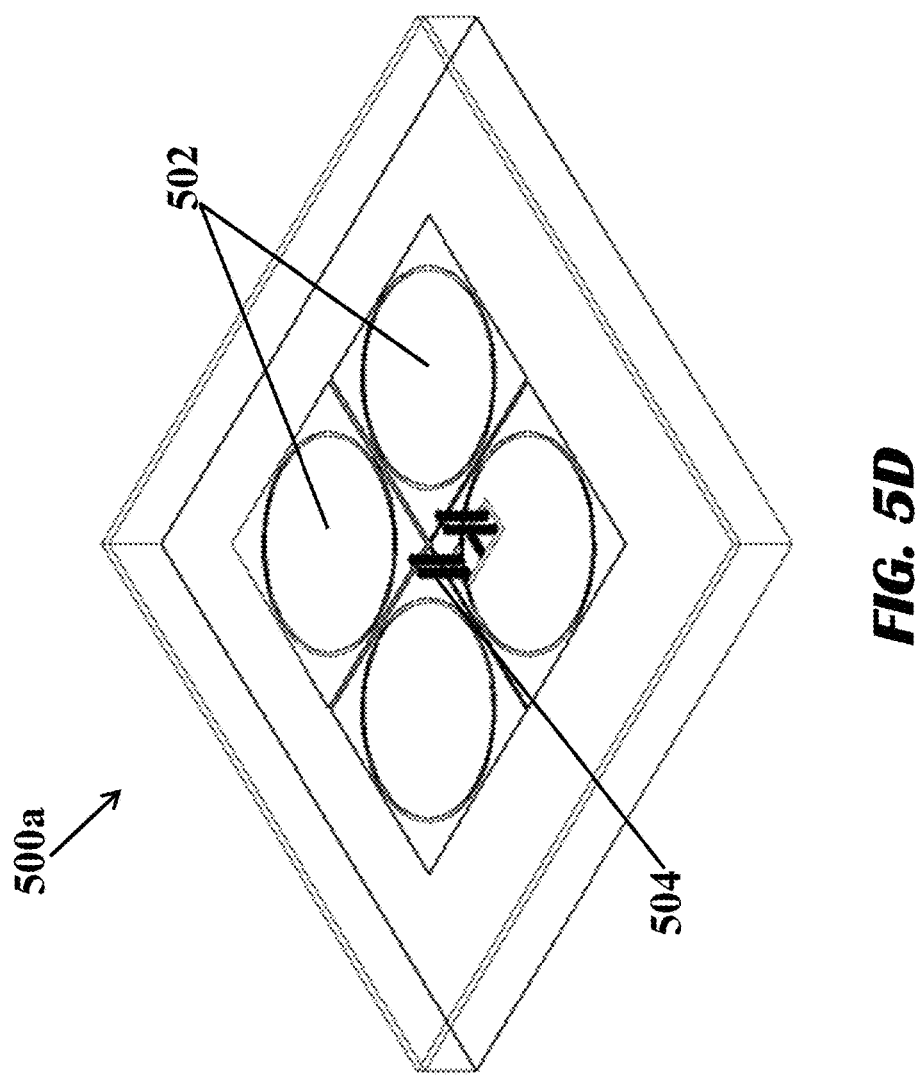
FIG. 5D illustrates an isometric view of a structure of a metamaterial board having a direct feeding excitation mechanism, according to an exemplary embodiment.

FIG. 5D illustrates an isometric view of a structure of a metamaterial board 500a having a direct feeding excitation mechanism, according to an exemplary embodiment. The illustrative embodiment has the metamaterial board 500a that may be identically configured to the metamaterial board 500 described in FIG. 5A, but not identical in all facets and thus this results in a compact form factor in this structure.

Figure 5E:
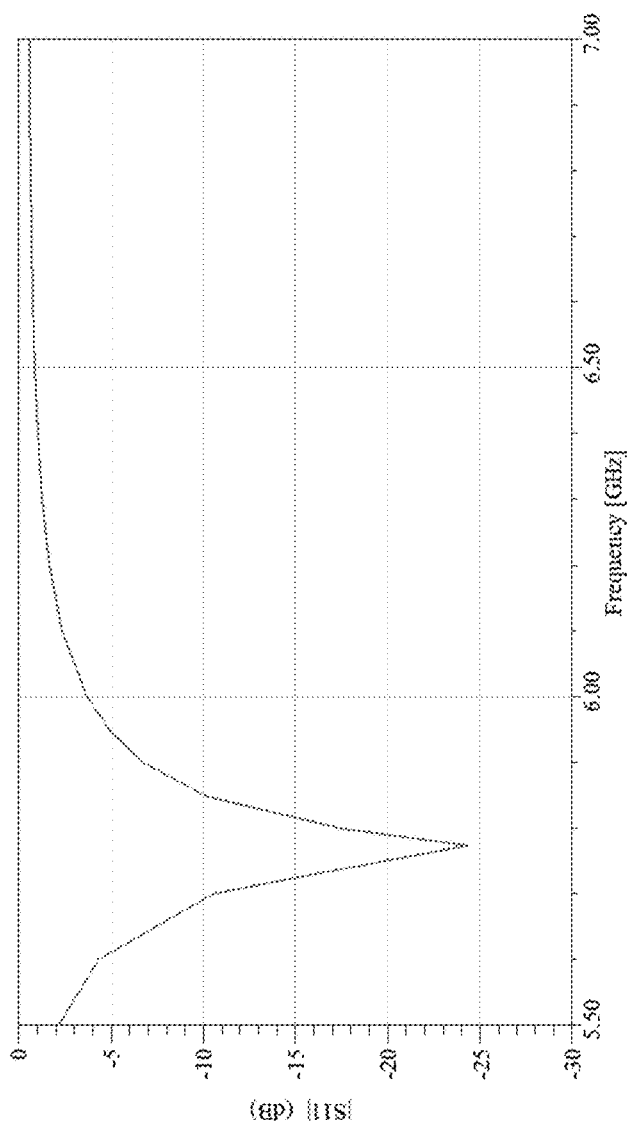
FIG. 5E illustrates a graph depicting a return loss of a metamaterial board having a direct feeding excitation mechanism of FIG. 5D, according to an exemplary embodiment.

FIG. 5E illustrates a graph depicting a return loss of a metamaterial board 500a having a direct feeding excitation mechanism FIG. 5D, according to an exemplary embodiment. The return loss (reflected power) of the metamaterial board 500a having the direct feeding excitation mechanism is measured in dB. The metamaterial board 500a resonates at a center frequency of 5.75 GHz. The impedance matching to a 50 Ohm RF port is at or below −25 dB. The impedance matching represents matching of the metamaterial board 500a to a standard RF port, which is typically 50 ohm. The impedance matching bandwidth at the −10 dB level is 160 MHz, or 3% with respect to a center frequency of the metamaterial board 500a. The impedance matching defines the operation frequency band of the structure of the metamaterial board 500a.

Figure 5F:
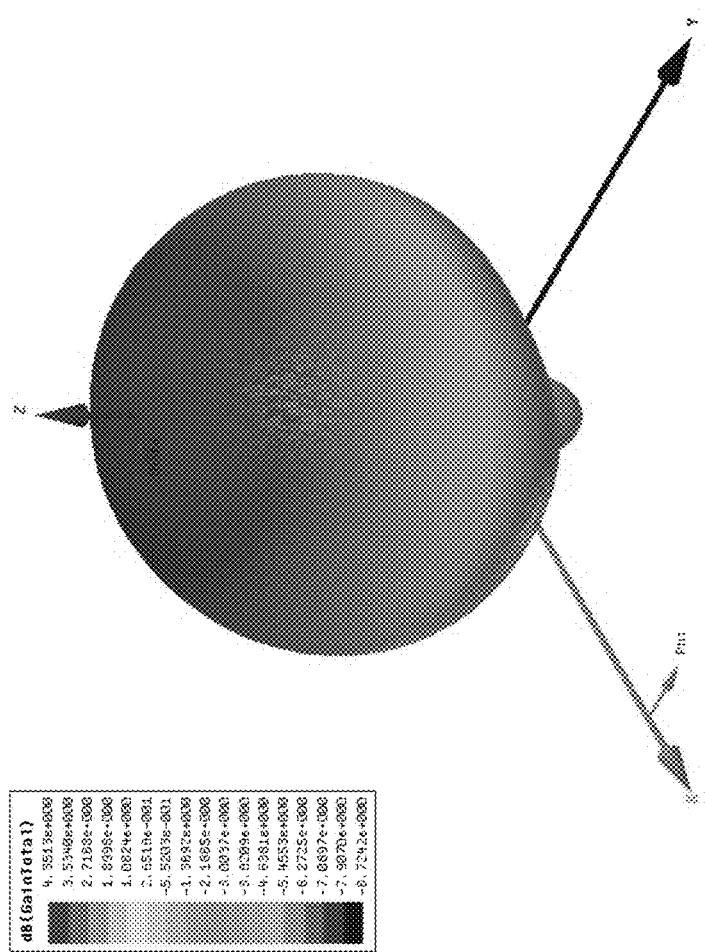
FIG. 5F illustrates an isometric view of a radiation gain pattern of a metamaterial board having a direct feeding excitation mechanism of FIG. 5D, according to an exemplary embodiment.

FIG. 5F illustrates an isometric view of a radiation gain pattern of a metamaterial board 500a having a direct feeding excitation mechanism of FIG. 5D, according to an exemplary embodiment. As shown, the metamaterial board 500a has a single directive electromagnetic beam of energy that is radiating upward/forward. The single directive electromagnetic beam is generated by excitation of entire four metamaterial unit cells 502. In the illustrative embodiment, the maximum gain is 4.4 dBi, which 0.6 dB lower relative to earlier embodiment described with respect to FIG. 5A and 1.6 dB lower than the earlier embodiments comprising sixteen metamaterial unit cells. Since the size of a conductive backing layer is same in earlier and the present embodiments, the directive radiation is caused by the collective excitation of all metamaterial unit cells 502 in the present embodiment as well as earlier embodiments.

Figure 6A:
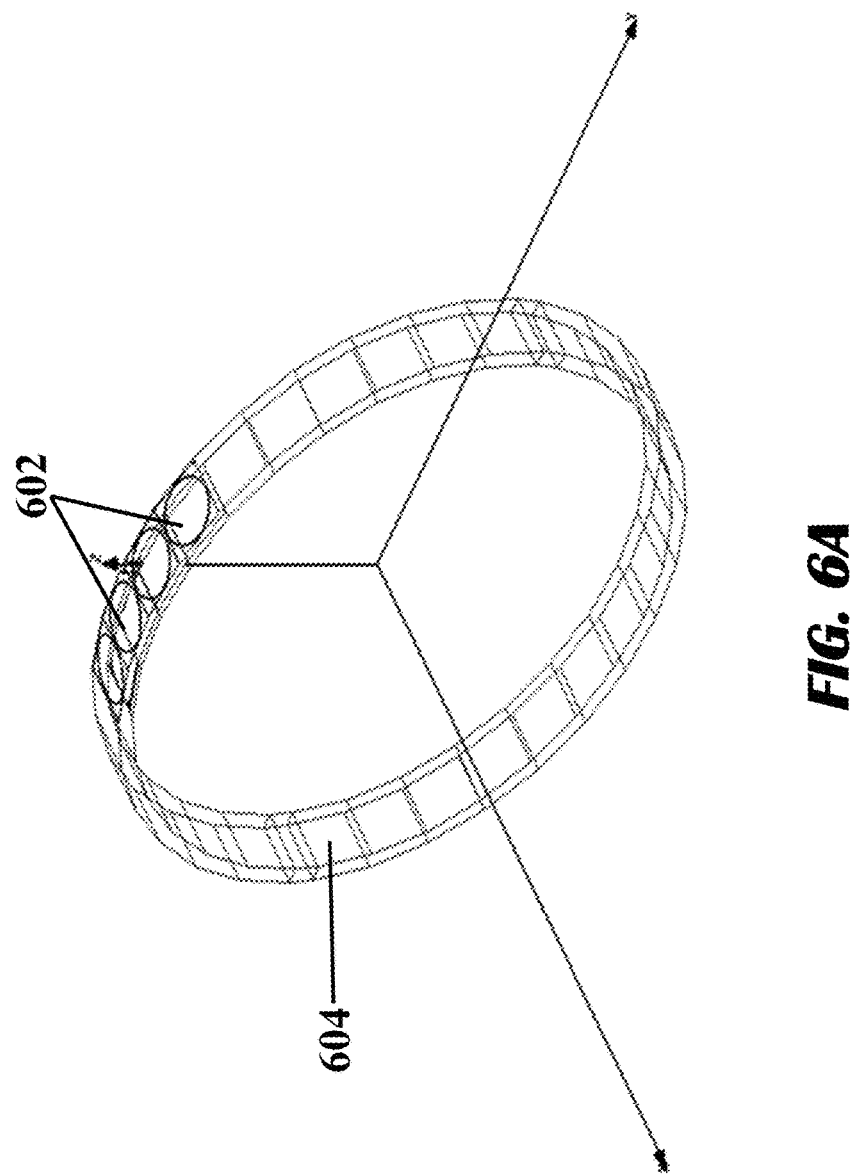
FIG. 6A illustrates a configuration of metamaterial unit cells for use as wearable antennas, according to an exemplary embodiment.

FIG. 6A illustrates a configuration of metamaterial unit cells for use as wearable antennas, according to an exemplary embodiment, and FIG. 6B illustrates an enlarged sectional view of the structure depicted in FIG. 6A. The metamaterial unit cells 602 are of small size and the size of the metamaterial unit cells 602 is smaller than a radius of curvature of a curved surface of any wrist wearable bracelet. This flexibility in size allows the metamaterial unit cells 602 to be etched on the curved surface of the bracelet. In the illustrated example, there is a wearable bracelet 604. The wearable bracelet 604 is made of a flexible plastic and is a flexible isolator. In one example, the thickness of the plastic is about 1.5 millimeters, and the inner diameter is about 60 millimeters. The number of the metamaterial unit cells 602 is four, and the metamaterial unit cells 602 are arranged in a linear array configuration. In the illustrated example, the size of each of the four metamaterial unit cells 602 is about six millimeters, however, it is to be noted that in other embodiments the metamaterial unit cells 602 can be of different size without moving out from the scope of the disclosed embodiments.

In the illustrated embodiment, the excitation mechanism employed for exciting the metamaterial unit cells 602 is a direct feeding exciting mechanism. It is to be noted that in other embodiments of the present disclosure, any other exciting mechanism may be employed for exciting the metamaterial unit cells 602 without moving out from the scope of the disclosed embodiments. In the direct feed exciting mechanism, a set of vias may directly excite the metamaterial unit cells 602. In the illustrative embodiment, there is only a single row of the metamaterial unit cells 602, and therefore a double set of vias may not be utilized, and a single set of vias may be utilized to excite the single row of the metamaterial unit cells 602. In the single set of vias, one via 606a is configured to have a positive polarity contact and another via 606b is configured to have a negative polarity contact. The positive polarity via 606a feeds and/or excite half proportion of the row of the metamaterial unit cells 602, and the negative polarity via 606b feeds and/or excite the other half proportion of the row of the metamaterial unit cells 602. The direct feed exciting mechanism is explained in detail in FIG. 3A.

In the illustrated example, the size of the each of the metamaterial unit cells 602 is 6 mm×6 mm×1.5 mm (bracelet thickness) or $0.11 \times 0.11 \times 0.03 \lambda^3$, where $\lambda$ is the wavelength at a frequency of operation. An inner diameter of the bracelet 604 is 60 mm which is similar to that of a standard-size wrist-worn bracelet. Alternate dimensions of the bracelet 604 may be utilized for different purpose.

Figure 6C:
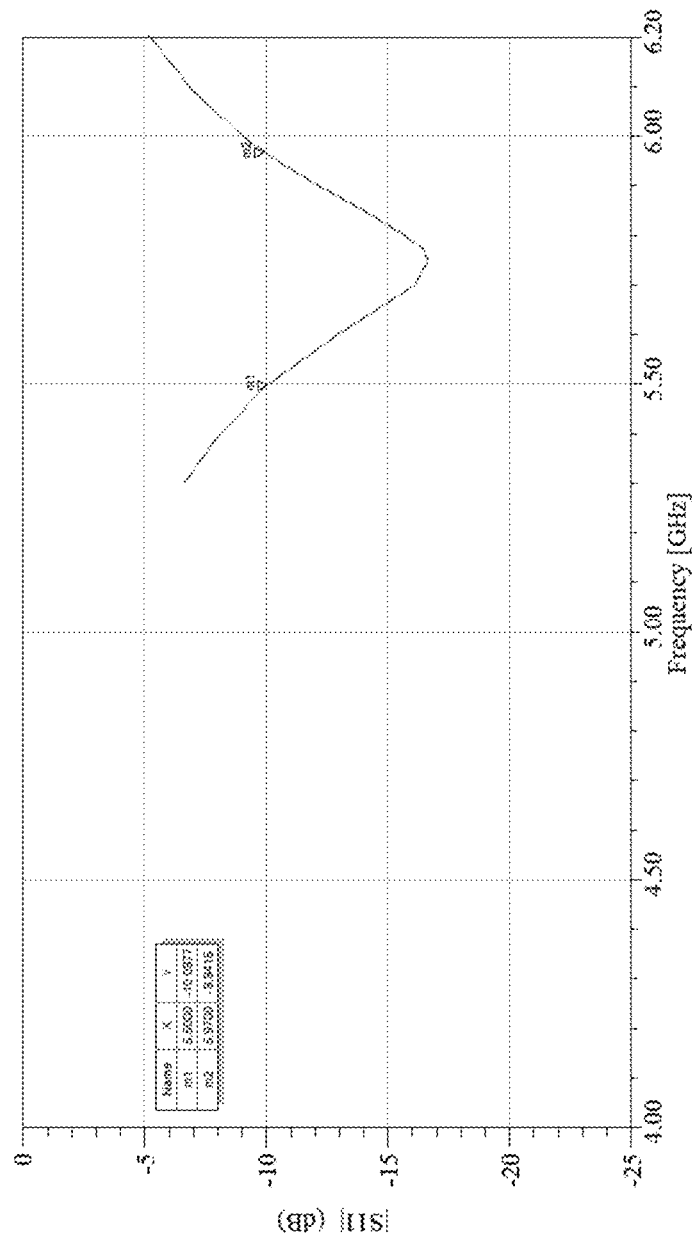
FIG. 6C illustrates a graph depicting a return loss metamaterial unit cells as wearable antennas of FIG. 6A, according to an exemplary embodiment.

FIG. 6C illustrates a graph depicting a return loss of metamaterial unit cells as wearable antennas of FIG. 6A, according to an exemplary embodiment. The return loss (reflected power) of the metamaterial unit cells 602 as wearable antennas is measured in dB. The metamaterial unit cells 602 as wearable antennas resonates at a center frequency of 5.75 GHz where the reflection is at the minimum. The resonant frequency of operation is determined by design of the metamaterial unit cells 602 and is not dependent on the number of the metamaterial unit cells 602. The impedance matching is to a 50-Ohm RF port and is at or below −10 dB. The impedance matching represents matching of the structure to a standard RF port, which is typically 50 ohms. The impedance matching bandwidth at the −10 dB level is 500 MHz, which is quite large, and defines the operation frequency band of the structure of the metamaterial unit cells 602 configured as wearable antennas. In addition to the other advantages described above, the present embodiment is ideal for wearable antennas due to this large natural bandwidth because it is desirable to have spare bandwidth to accommodate impedance because the impedance provides a tuning effect from adjacent structures, such as from objects behind the bracelet 604 (e.g., human hand).

Figure 6D:
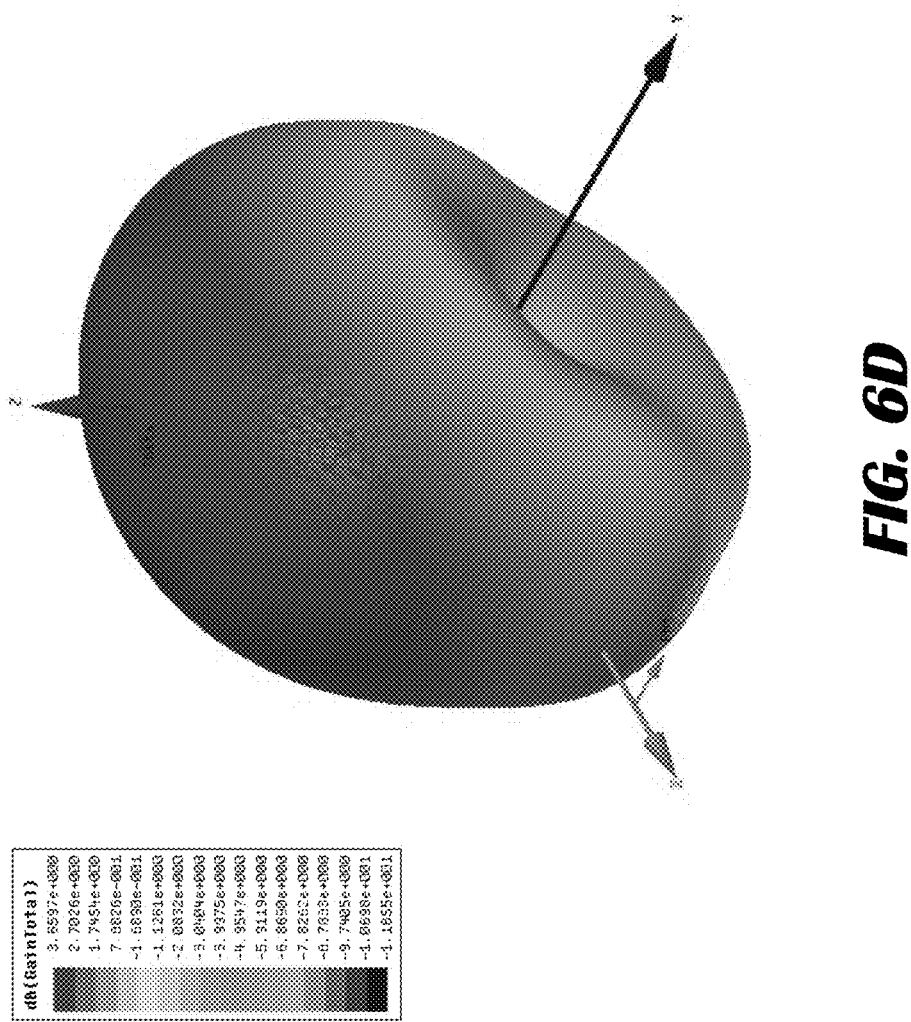
FIG. 6D illustrates an isometric view of a radiation gain pattern of metamaterial unit cells as wearable antennas of FIG. 6A, according to an exemplary embodiment.

FIG. 6D illustrates a 3-dimensional isometric view of a radiation gain pattern of metamaterial unit cells as wearable antennas of FIG. 6A, according to an exemplary embodiment. As shown, the metamaterial unit cells 602 as wearable antennas has a single directive electromagnetic beam of energy that is radiating upward/forward, that is, along the z-axis. The single directive electromagnetic beam is generated by excitation of a plurality of the metamaterial unit cells 602 and there is minimum radiation towards the inside of the bracelet 604 and into a human wrist. In the illustrative embodiment, a maximum gain is 3.7 dBi, and an antenna radiation efficiency is 91%.

Figure 7A:
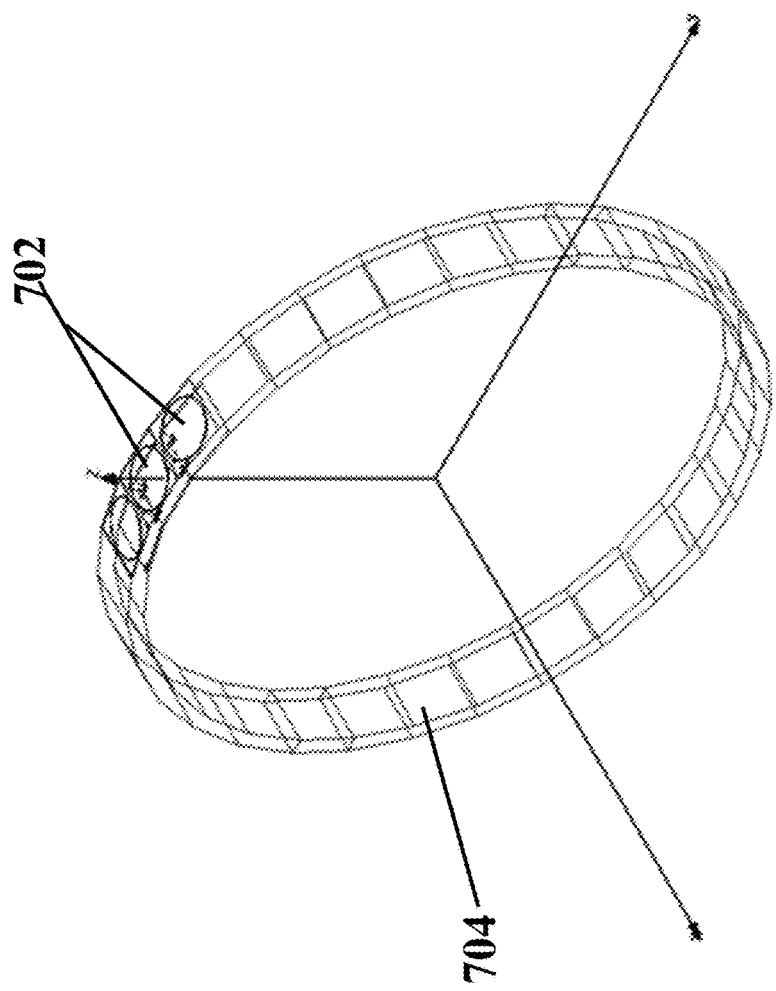
FIG. 7A illustrates a structure of metamaterial unit cells configured as wearable antennas, according to an exemplary embodiment.
Figure 7B:
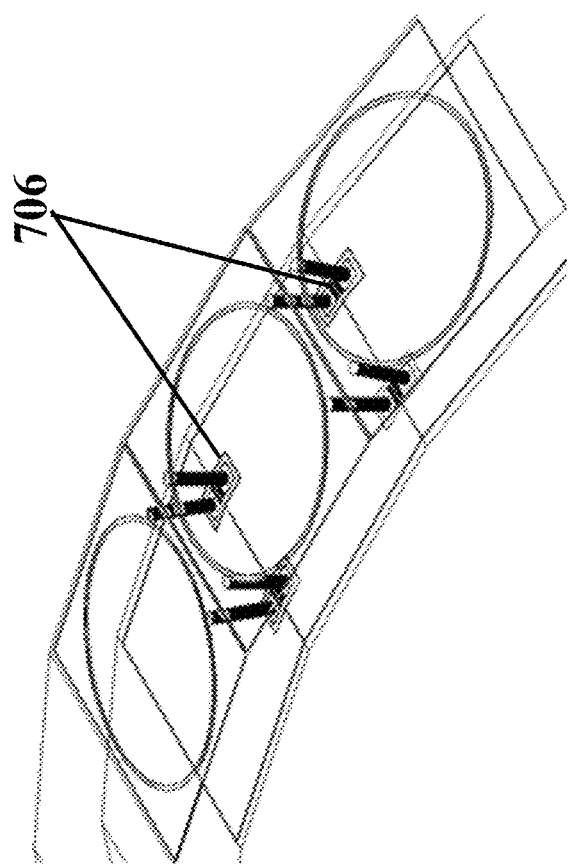
FIG. 7B illustrates an enlarged sectional view of a structure of metamaterial unit cells configured as wearable antennas, according to an exemplary embodiment.

FIG. 7A illustrates a structure of metamaterial unit cells configured as wearable antennas, according to an exemplary embodiment, and FIG. 7B illustrates an enlarged sectional view of the structure depicted in FIG. 7A. FIG. 7A shows another embodiment of radiative metamaterials unit cells 702 as wearable/flexible/conformal antennas. In this embodiment, a bracelet 704 may have the same dimensions as of the bracelet 604 depicted in the embodiment of the FIG. 6A, however, there are three metamaterials unit cells 702 of smaller size attached on a curved surface of the bracelet 704.

In the illustrative embodiment, the three metamaterials unit cells 702 are probed with four RF ports 706, making the structure equivalent to an extremely dense 4-antenna array. In a receiving mode configuration, the three metamaterials unit cells 702 absorbs RF energy which is directed to distinct prescribed locations. In other words, the three metamaterials unit cells 702 operate as uniform materials that absorb electromagnetic radiation with high absorption efficiency.

The three metamaterials unit cells 702 can be tapped by inserting four localized RF ports 706 to the three metamaterials unit cells 702. This power is then directed specifically to the localized RF ports 706. In view of that, this structure with the metamaterials unit cells 702 works as a dense antenna array with many RF ports 706 that receive the absorbed energy. Such structure is ideal for very physically small receivers where there is a need to distribute the received power to multiple channels simultaneously. In addition, these multiple densely placed RF ports 706 can accept phase control, resulting in electronically modulated RF patterns.

In an embodiment, this structure with the metamaterials unit cells 702 has a very small form factor that matches a receiver ASIC (not shown). The ASIC is positioned in middle behind a conductive backing layer positioned at the bottom of the structure, and would be configured to connect its inputs to the four RF ports 706. Since the tapping can be performed at different places, the ASIC may require less power per RF port. In order to obtain bandwidth in the structure, both the space as well as thickness of a substrate is required. In the illustrative embodiment, a 2 GHz bandwidth may be obtained using a structure including three metamaterial unit cells 702 and four RF ports 706.

Figure 8A:
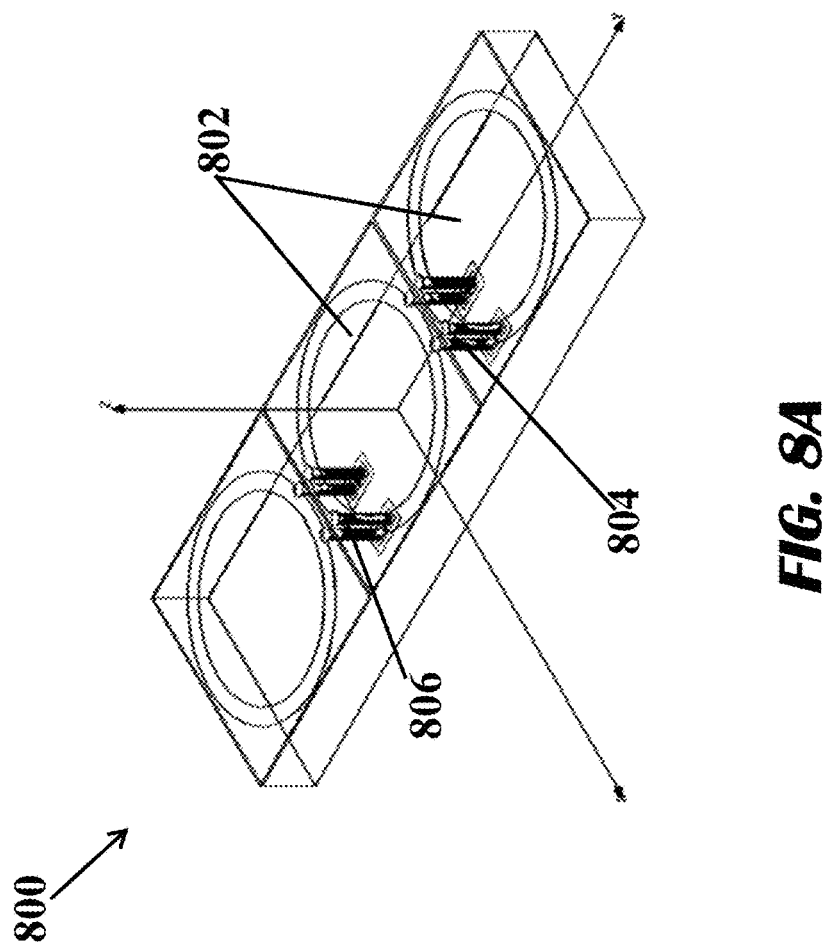
FIG. 8A illustrates an isometric view of a structure of a metamaterial board configured as an antenna array, according to an exemplary embodiment.

FIG. 8A illustrates an isometric view of a structure of a metamaterial board 800 configured as a flat antenna array that can be fabricated on standard PCB boards, according to an exemplary embodiment. In an embodiment, radiative metamaterials unit cells 802 are configured as the antenna arrays to receive and/or transmit RF signals. The metamaterials unit cells 802 are connected to 4 RF ports, making this structure equivalent of four antennas that are extremely closely spaced. The present embodiment is the equivalent of the wearable configuration of FIG. 7A, but on a flat platform appropriate for systems realized on standard flat boards. In a receive mode of operation, the absorbed power is then directed specifically to localized RF ports 804 and 806. The structure is ideal for physically small receivers where there is a need to distribute the received power to multiple channels simultaneously. In addition, the multiple densely placed RF ports 804 and 806 can accept phase control, resulting in electronically modulated RF patterns.

In the illustrated example, the metamaterial unit cell 802 size is 6 mm×6 mm×1.5 mm (bracelet thickness) or 0.11× 0.11×0.03$\lambda^3$, where $\lambda$ is the wavelength at the frequency of operation. The overall metamaterial structure dimension is 6 mm×18 mm×1.5 mm or 0.11×0.33×0.03$\lambda^3$. Alternate dimensions of the metamaterial unit cell 802 and bracelet thickness may be utilized.

Figure 8B:
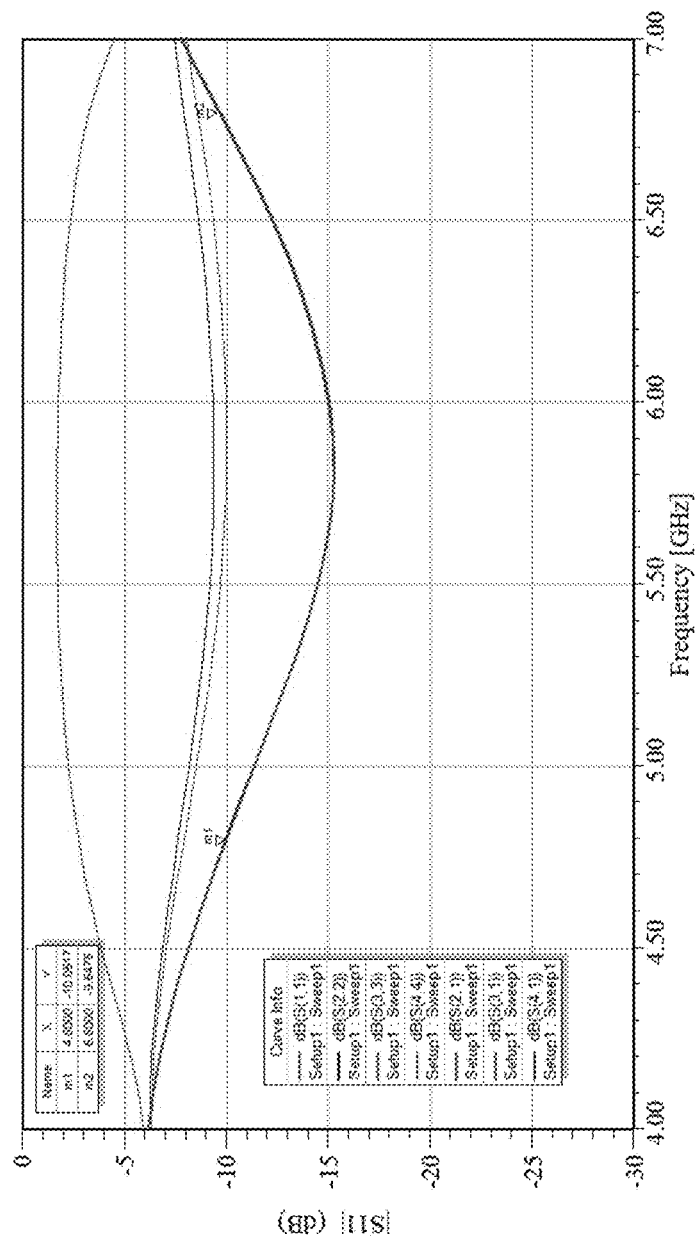
FIG. 8B illustrates a graph depicting a return loss of a metamaterial board configured as an antenna array of FIG. 8A, according to an exemplary embodiment.

FIG. 8B illustrates a graph depicting a return loss of a metamaterial board 800 configured as an antenna array of FIG. 8A, according to an exemplary embodiment. The return loss (reflected power) of the metamaterial board 800 as the antenna array is measured in dB. The impedance matching is at −10 dB. The impedance matching represents matching of the metamaterial board 800 as antenna array to a standard RF port, which is typically 50 ohm. The impedance matching bandwidth at the −10 dB level is 2 GHz, or 35% with respect to a center frequency of the metamaterial board 800. This defines the operation frequency band of the metamaterial board 800 as flat antenna array.

FIG. 8C illustrates an isometric view of a radiation gain pattern of a metamaterial board configured as an antenna array of FIG. 8A, according to an exemplary embodiment. As shown, the metamaterial board 800 as the antenna array has a single directive electromagnetic beam of energy that is radiating upward/forward, that is, along the z-axis. The single directive electromagnetic beam is generated by excitation of all of the metamaterials unit cells 802. In the illustrative embodiment, the maximum gain is 3.6-3.8 dBi. Since the size of a conductive backing layer (positioned at the bottom of the metamaterial board 800) is same as defined in earlier embodiments, a directive radiation is caused by the collective excitation of a plurality of metamaterials unit cells 802 in the present embodiment as well as earlier embodiments. Also, there is minimal radiation on the backside of the metamaterial board 800, and an antenna radiation efficiency is about 90%.

Figure 9A:
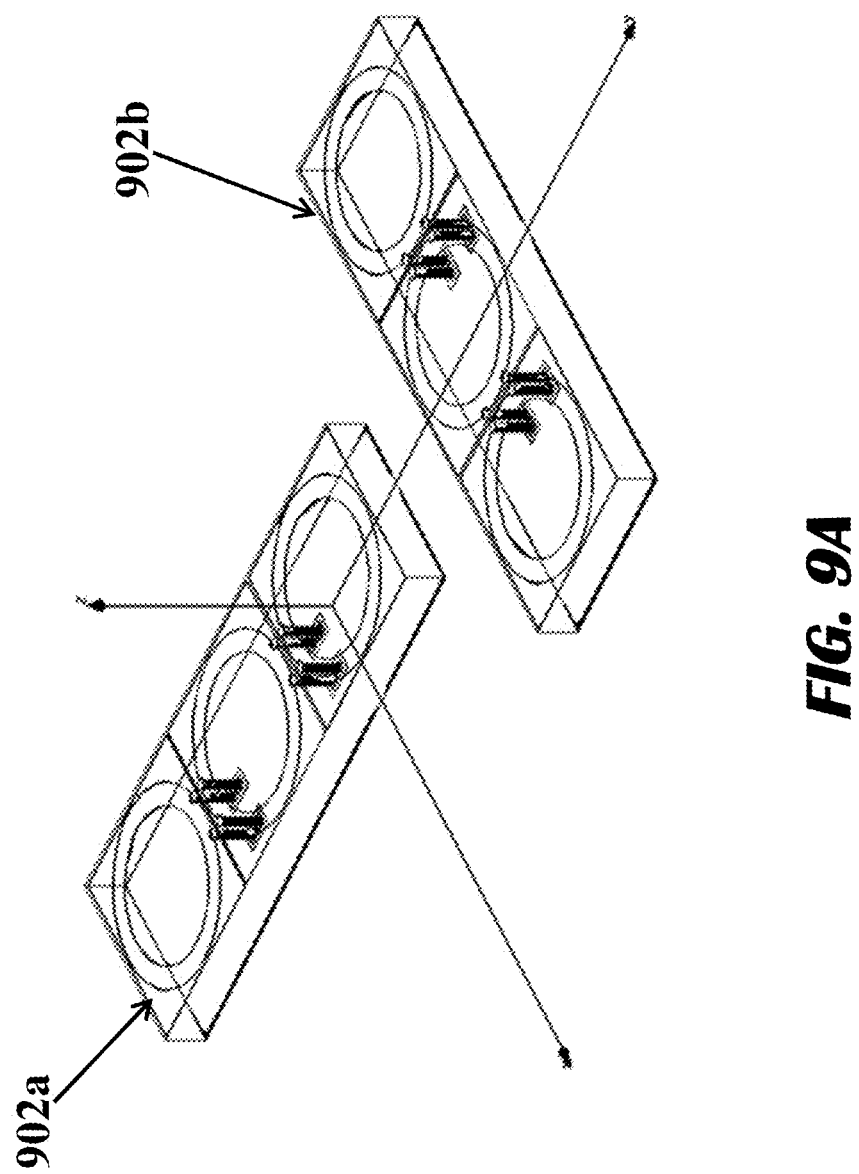
FIG. 9A illustrates an isometric view of a metamaterial board including two orthogonal sub-arrays, according to an exemplary embodiment.

FIG. 9A illustrates an isometric view of a structure of a metamaterial board including two orthogonal sub-arrays, according to an exemplary embodiment. In the illustrated embodiment, there are two sub-arrays 902a and 902b that are laid out on a common dielectric substrate. Each of the two sub-arrays 902a and 902b has three metamaterials unit cells that are connected to 4 RF ports, thereby making the structure of each of the two sub-arrays 902a and 902b equivalent of four antennas that are extremely closely spaced. The impedance matching of the two sub-arrays 902a and 902b, for all 8 RF ports, may be identical to each metamaterial board 800, shown in FIG. 8B.

Figure 9B:
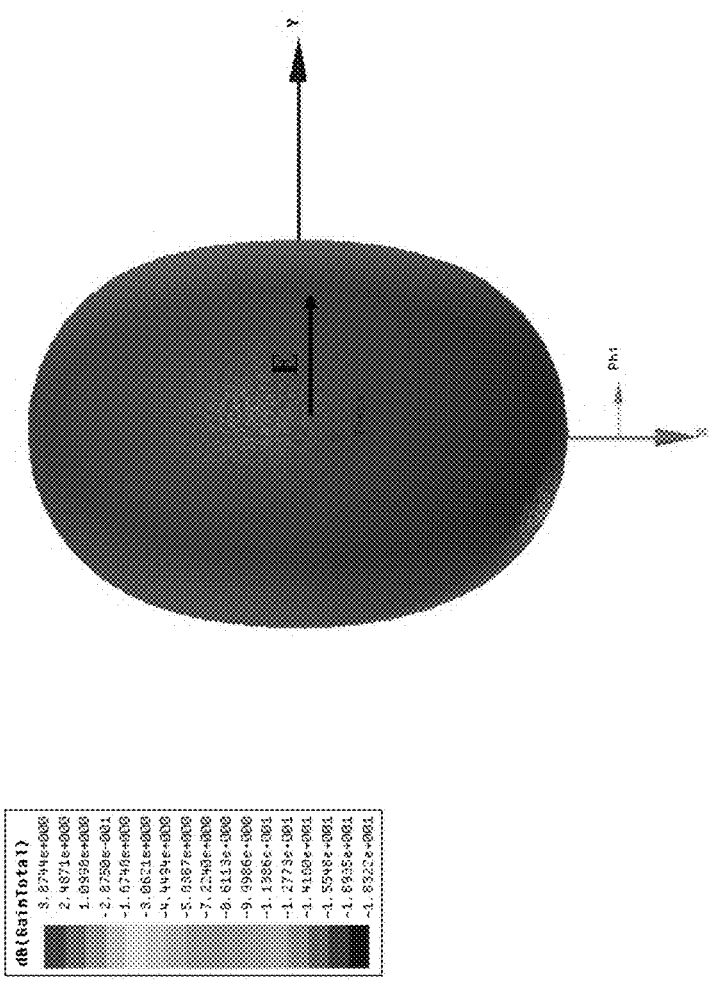
FIG. 9B illustrates a planar view of a radiation gain pattern of a metamaterial board including two orthogonal sub-arrays of FIG. 9A, according to an exemplary embodiment.
Figure 9C:
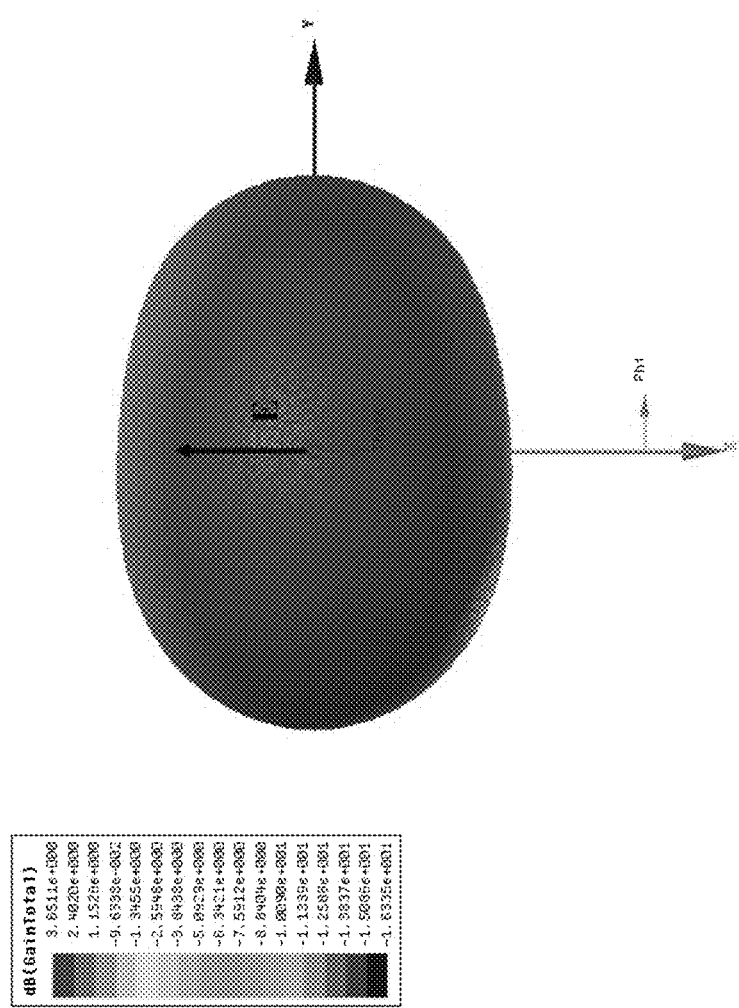
FIG. 9C illustrates a planar view of a radiation gain pattern of a metamaterial board including two orthogonal sub-arrays of FIG. 9A, according to an exemplary embodiment.

In an embodiment, if only the metamaterials unit cells of the sub-array 902a of FIG. 9A are active, the 3D radiation gain as seen from the top is shown in FIG. 9B. The polarization, which is the electric field direction, of the structure, at a far-field point on the z-axis, is also shown in FIG. 9B. In an embodiment, if the metamaterials unit cells of the sub-array 902b of FIG. 9A are active, the 3D radiation gain as seen from the top is shown in FIG. 9C. The polarization of the structure, at a far-field point on the z-axis, is also shown in FIG. 9C and the polarization along the z-axis is orthogonal to the polarization of FIG. 9C.

Figure 9D:
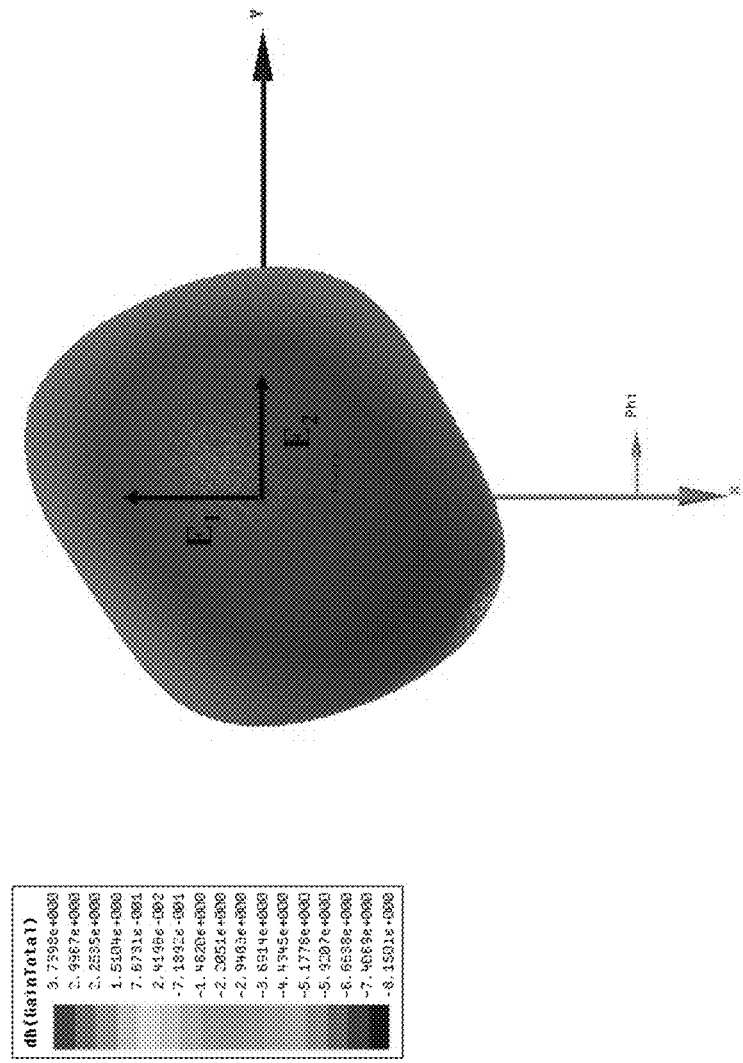
FIG. 9D illustrates a planar view of a radiation gain pattern of a metamaterial board including two orthogonal sub-arrays of FIG. 9A, according to an exemplary embodiment.
Figure 9E:
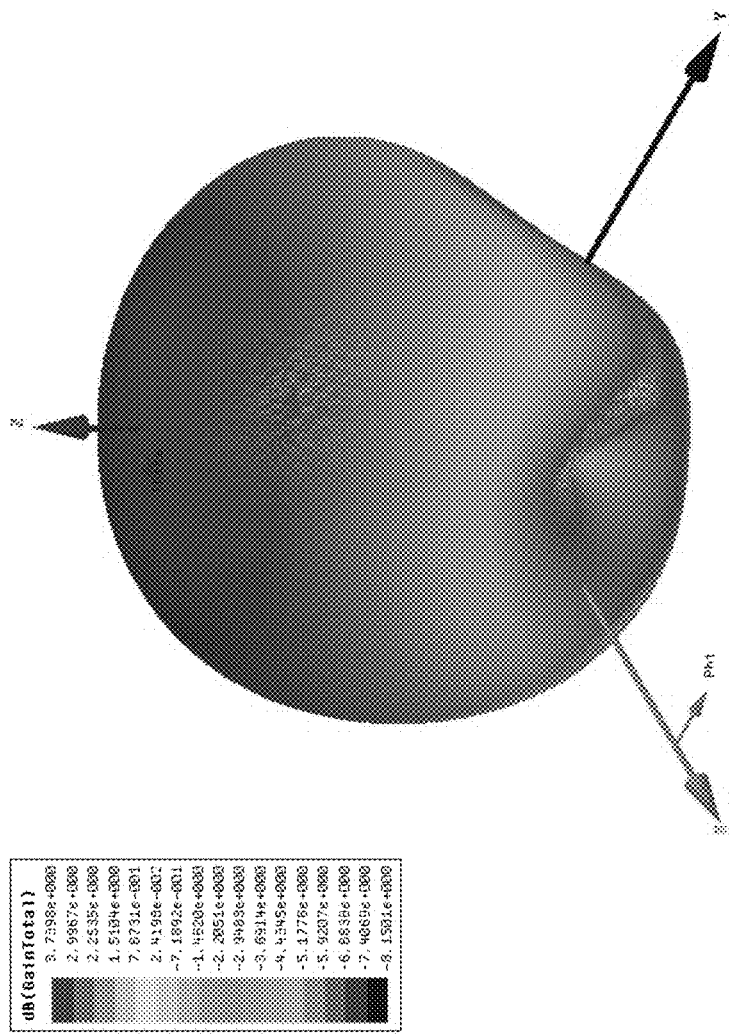
FIG. 9E illustrates an isometric view of a radiation gain pattern of a metamaterial board including two orthogonal sub-arrays of FIG. 9A, according to an exemplary embodiment.

In the illustrative embodiment, when all eight RF ports of the structure are active, i.e., when both two sub-arrays 902a and 902b have active RF ports, the radiation gain is shown in FIGS. 9D and 9E. The radiation gain has a rhombic, or rotated square shape. When the structure is implemented as a receiver, per the radiation gain pattern shown, it is clear that the structure receives electromagnetic power polarized either in the x-axis or the y-axis direction, equally. Thus, this metamaterial board structure with the two sub-arrays 902a and 902b is a very compact and extremely efficient dual linear polarization receiver array. The structure may be able to receive both polarizations, and therefore a signal may always be present to charge a battery or other chargeable device from received RF signals.

Figure 10:
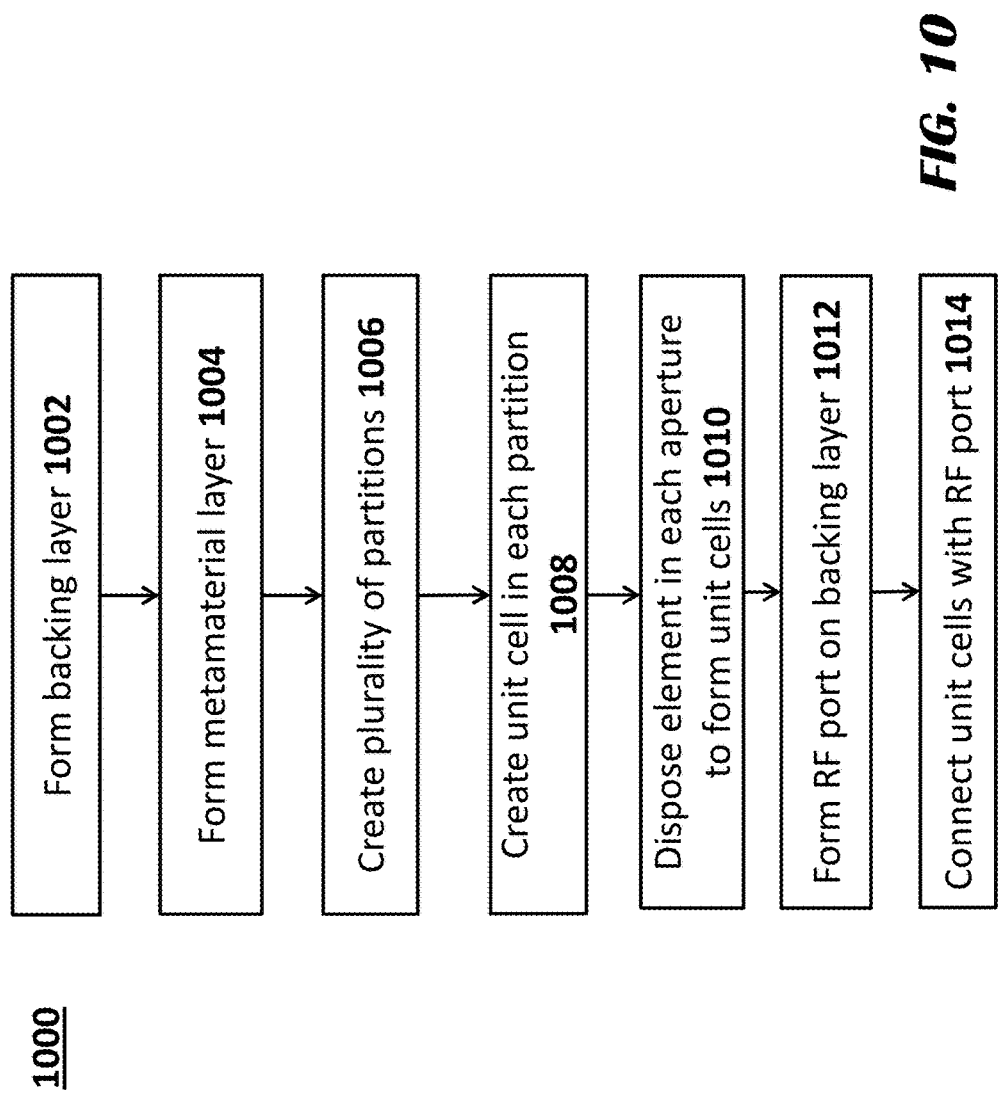
FIG. 10 illustrates a method of forming a metamaterial board, according to an exemplary embodiment.

FIG. 10 illustrates a method of forming a metamaterial board, according to an exemplary embodiment.

At step 1002, a backing layer is formed. In the metamaterial board fabrication, the conductive backing layer is placed at the bottom of the structure of the metamaterial board. At step 1004, a metamaterial layer is formed. The metamaterial layer may be formed by a metamaterial substrate. In one embodiment, the metamaterial layer may be deposited above the conductive backing layer, and then may be etched to create an array of metamaterial unit cells at step 1006. Hereinafter, the term "unit cell" and "metamaterial unit cell" may be interchangeably used. In an embodiment, a distance between the conductive backing layer, and the metamaterial layer is such that there is no short-circuit between the conductive backing layer and the metamaterial layer in order to make the metamaterial unit cells radiate. Below the metamaterial layer and above the conductive backing layer 102 may be deposited a layer of dielectric or insulating material, often a silicon dioxide.

At step 1006, a plurality of partitions may be created. A surface is created in the metamaterial layer. In one embodiment, the surface created is a substantially flat surface. In another embodiment, the surface created is not a substantially flat surface or a flat surface. The surface of the metamaterial layer may be composed of a plurality of partitions The plurality of partitions are created on the surface of the metamaterial layer. Each of the plurality of partition includes identical unit cells. In an alternative embodiment, two different partitions may contain different unit cells.

At step 1008, a unit cell is created in each partition. The unit cell is defined as a surface, which by periodic repetition fills the surface of each partition. Within the surface of the unit cell, a metal patch of a square or other arbitrary shape may be inscribed. Within the metal patch an aperture exists. The aperture is defined such that a periphery of the aperture is within a periphery of the metal patch by a spacing distance. At step 1010, a metallic element is disposed in each aperture to form unit cells. In one embodiment, the element is a circular element (or disk) that may be disposed within each aperture to form unit cells. The unit cell is therefore defined as the composite shape composed of the unit cell surface, the inscribed metal patch, the aperture within the metal patch and the metallic element within that aperture. Each different partition in the plurality of partitions that collectively forms the metamaterial layer, may be composed of different types of unit cells.

At step 1012, RF port is formed on backing layer. The RF ports may be located on or behind the conductive backing layer. The RF ports may include a housing having any arbitrary shape, and manufactured from plastic, metal, or any other convenient material. At step 1014, unit cells are connected to RF port. The dielectric layer may be masked and etched to open narrow profile openings known as vias. The vias respectively extend as an opening through the dielectric layer to a portion of the metamaterial layer. In one embodiment, the vias may be present to provide electrical paths between different metal layers of the metamaterial board by connecting the unit cells with the RF port.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A metamaterial system of a wireless transmission apparatus comprising:
   a metamaterial layer comprising an array of unit cells, each of the unit cell including a surface having an aperture, the aperture is defined such that a periphery of the aperture is within a periphery of the surface by a spacing distance; and an element is disposed within the aperture;
   at least one input RF port disposed on a backing layer placed below the metamaterial layer such that there is no short-circuit between the conductive backing layer and the metamaterial layer; and
   at least one set of vias connecting the array of unit cells with the at least one input RF port.

2. The metamaterial system of the wireless transmission apparatus of claim 1, wherein the array of unit cells are electrically interconnected by one or more switches realized by integrated diodes or RF microelectromechanical devices.

3. The metamaterial system of the wireless transmission apparatus of claim 1, wherein the array of unit cells comprises a first subset of unit cells and a second subset of unit cells, and wherein the first subset of unit cells comprises unit cells of one category of shape and sizes, and wherein the second sunset of unit cells comprises unit cells of another category of shape and sizes.

4. The metamaterial system of the wireless transmission apparatus of claim 1, wherein the shape and size of the unit cells is configured to obtain one or more of linear, circular or elliptical polarization.

5. The metamaterial system of the wireless transmission apparatus of claim 1, wherein the array of unit cells comprises multiple unit cells wherein each unit cell has a different design with respect to other unit cells.

6. The metamaterial system of the wireless transmission apparatus of claim 1, wherein the array of unit cells is configured to create beam forming and beam steering without any phase-shifting networks.

7. The metamaterial system of the wireless transmission apparatus of claim 1, wherein the array of unit cells is placed in a closely spaced orthogonal orientations, resulting in dual linearly-polarized antenna systems that transmit or receive electromagnetic waves simultaneously in orthogonal linear polarizations.

8. The metamaterial system of the wireless transmission apparatus of claim 1, wherein a plurality of unit cells in the array of unit cells are simultaneously electromagnetically excited.

9. The metamaterial system of the wireless transmission apparatus of claim 1, wherein the array of unit cells is electromagnetically excited by a contactless capacitive coupling.

10. The metamaterial system of the wireless transmission apparatus of claim 1, wherein the array of the unit cells is electromagnetically excited by a co-planar coupling.

11. The metamaterial system of the wireless transmission apparatus of claim 1, wherein the array of the unit cells is electromagnetically excited by a direct feeding excitation mechanism using the at least one set of vias.

12. The metamaterial system of the wireless transmission apparatus of claim 1, wherein each of the unit cell in the array of unit cells is designed as a thin-sized reflector.

13. The metamaterial system of the wireless transmission apparatus of claim 1, wherein each of the unit cell in the array of unit cells is small in size, and wherein the array of small sized unit cells is configured to be integrated on curved shapes and geometries of wearable products.

14. The metamaterial system of the wireless transmission apparatus of claim 1, wherein the array of unit cells in a receiving mode operate to absorb electromagnetic radiation with high absorption efficiency.

15. The metamaterial system of the wireless transmission apparatus of claim 1, wherein the at least one set of vias has an electrically conductive filling.

16. A method of forming a metamaterial system, comprising:
   forming a backing layer;
   forming a metamaterial layer from a metamaterial substrate, the metamaterial layer is formed above the backing layer;
   creating a plurality of partitions in the metamaterial layer, each of the plurality of partitions define a portion of a unit cell of a plurality of unit cells;
   creating an aperture in each of the plurality of partitions, the aperture is defined such that a periphery of the aperture is within a periphery of a partition in which the aperture is created by a spacing distance;
   disposing an element in the aperture of each of the plurality of partitions;
   forming at least one input RF port on the backing layer such that there is no short-circuit between the backing layer and the metamaterial layer; and
   connecting by at least one set of vias the plurality of unit cells with the at least one input RF port.

17. A method of forming a metamaterial system of claim 16, wherein the frequency of the unit cell is configured to operate in a frequency band ranging from 900 MHz to 100 GHz.

18. A method of forming a metamaterial system of claim 16, wherein the unit cell is configured to receive wireless signals.

19. A method of forming a metamaterial system of claim 16, wherein the plurality of unit cells comprises multiple unit cells, wherein each unit cell has a different design with respect to other unit cells.

20. A method of forming a metamaterial system of claim 16, further comprising creating a substantial flat surface on the metamaterial layer, wherein the plurality of unit cells are formed on the substantially flat surface of the metamaterial layer.

* * * * *

UNITED STATES PATENT AND TRADEMARK OFFICE
CERTIFICATE OF CORRECTION

PATENT NO. : 9,899,744 B1  
APPLICATION NO. : 14/925469  
DATED : February 20, 2018  
INVENTOR(S) : Contopanagos et al.

Page 1 of 1

It is certified that error appears in the above-identified patent and that said Letters Patent is hereby corrected as shown below:

On the Title Page

In the Abstract (57), Line 3, please delete "of the unit cell" and insert --of the unit cells--;

In the Claims

Claim 1, Column 26, Line 55, please delete "of the unit cell" and insert --of the unit cells--;

Claim 7, Column 27, Line 24, please delete "in a closely spaced" and insert --in closely spaced--;

Claim 12, Column 27, Line 44, please delete "of the unit cell" and insert --of the unit cells--;

Claim 13, Column 27, Line 47, please delete "of the unit cell" and insert --of the unit cells--.

Signed and Sealed this  
Seventeenth Day of April, 2018

Andrei Iancu  
*Director of the United States Patent and Trademark Office*